United States Patent
Yamamoto

(10) Patent No.: US 7,567,708 B2
(45) Date of Patent: Jul. 28, 2009

(54) APPARATUS AND METHOD FOR IMAGE PROCESSING

(75) Inventor: Kunihiro Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/843,481

(22) Filed: Aug. 22, 2007

(65) Prior Publication Data

US 2007/0297671 A1  Dec. 27, 2007

Related U.S. Application Data

(62) Division of application No. 10/375,195, filed on Feb. 28, 2003, now Pat. No. 7,321,687.

(30) Foreign Application Priority Data

| Mar. 7, 2002 | (JP) | ............................ 2002-062299 |
| Jun. 27, 2002 | (JP) | ............................ 2002-188352 |
| Jun. 27, 2002 | (JP) | ............................ 2002-188353 |

(51) Int. Cl.
*G06K 9/34* (2006.01)
*G06K 9/36* (2006.01)

(52) U.S. Cl. ...................... 382/175; 382/286

(58) Field of Classification Search ................ None
See application file for complete search history.

(56) References Cited

U.S. PATENT DOCUMENTS

| 5,321,769 A | 6/1994 | Takahashi et al. ............ 382/174 |
| 5,321,770 A | 6/1994 | Huttenlocher et al. ........ 382/174 |
| 5,438,636 A | 8/1995 | Surka ........................... 382/279 |
| 5,446,802 A | 8/1995 | Tada et al. .................... 382/170 |
| 5,592,572 A * | 1/1997 | Le .............................. 382/289 |
| 5,875,262 A * | 2/1999 | Asada .......................... 382/169 |
| 5,923,788 A | 7/1999 | Rao ............................. 382/275 |
| 5,966,455 A | 10/1999 | Saito ........................... 382/112 |

(Continued)

FOREIGN PATENT DOCUMENTS

JP  64-1076  1/1989

(Continued)

OTHER PUBLICATIONS

Endo, Etsuro et al., "Adobe Photoshop A to Z", Adobe Photoshop A to Z, Japan, Kabushiki Kaisha BNN, Feb. 20, 1994, First Edition, pp. 4-14 to 4-17 (Translation included).

*Primary Examiner*—Matthew C Bella
*Assistant Examiner*—Yuzhen Ge
(74) *Attorney, Agent, or Firm*—Fitzpatrick, Cella, Harper & Scinto

(57) ABSTRACT

This disclosure relates to an image processing apparatus or an image processing method, and takes as its technical problem the fact that conventionally it is difficult to perform a process of carving out a rectangle with high precision in a noisy environment.

Therefore, as to an image made by binarizing an original image, histograms of the numbers of horizontal and vertical black pixels thereof are created and trapezoidal approximation is performed on the histograms so as to detect vertex coordinates indicating an extent of a rectangular area in the binary image. An inclination direction of the rectangular area in the extent is detected so that the rectangular area can be detected from the binary image with high precision.

10 Claims, 22 Drawing Sheets

U.S. PATENT DOCUMENTS

| | | | |
|---|---|---|---|
| 6,026,183 A | 2/2000 | Talluri et al. | 382/194 |
| 6,035,064 A | 3/2000 | Nakao et al. | 382/200 |
| 6,044,178 A * | 3/2000 | Lin | 382/260 |
| 6,249,604 B1 | 6/2001 | Huttenlochet et al. | 382/174 |
| 6,325,287 B1 | 12/2001 | Nakajima et al. | 235/462.1 |
| 6,356,657 B1 * | 3/2002 | Takaoka et al. | 382/197 |
| 7,003,159 B2 | 2/2006 | Yamaai | 382/199 |
| 7,145,694 B2 * | 12/2006 | Suzuki et al. | 358/2.1 |

FOREIGN PATENT DOCUMENTS

| | | |
|---|---|---|
| JP | 56-105579 | 8/1991 |
| JP | 5-46762 | 2/1993 |
| JP | 61-74453 | 4/1996 |
| JP | 8-237537 | 9/1996 |
| JP | 10-098609 | 4/1998 |
| JP | 2000-165639 | 6/2000 |
| JP | 2000-285240 | 10/2000 |
| JP | 2002-32763 | 1/2002 |

* cited by examiner

F I G. 5
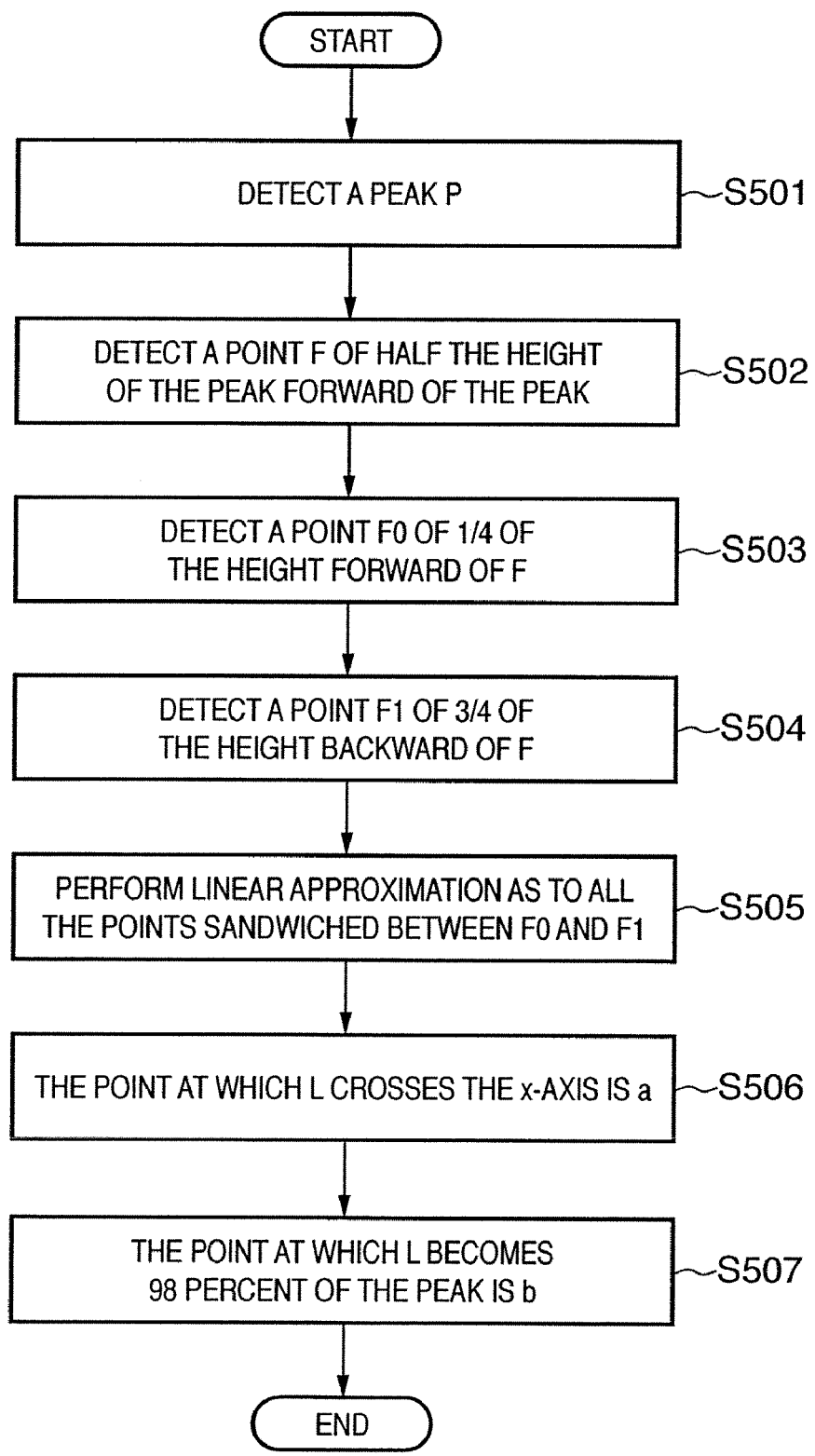

FIG. 7
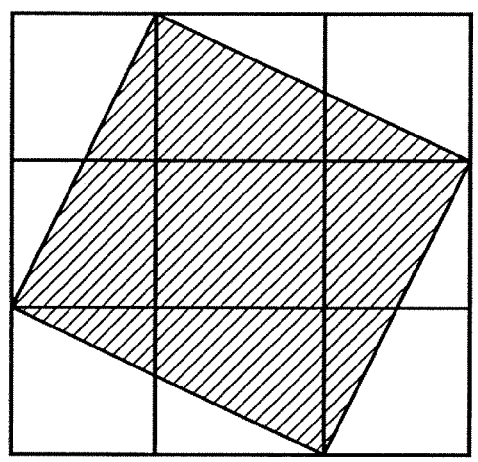
MODE1
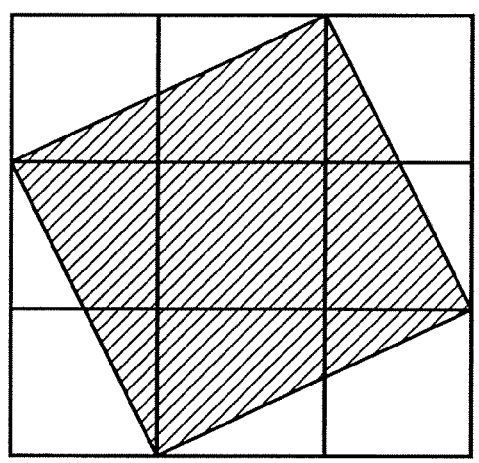
MODE-1
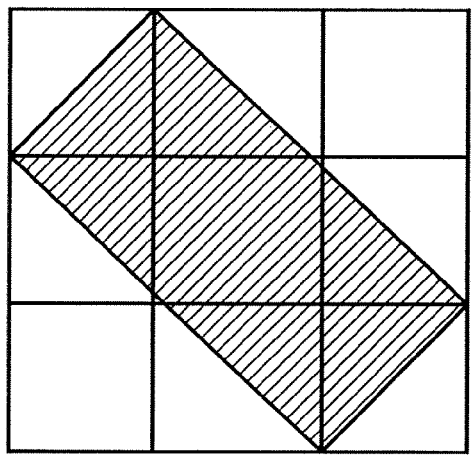
MODE2
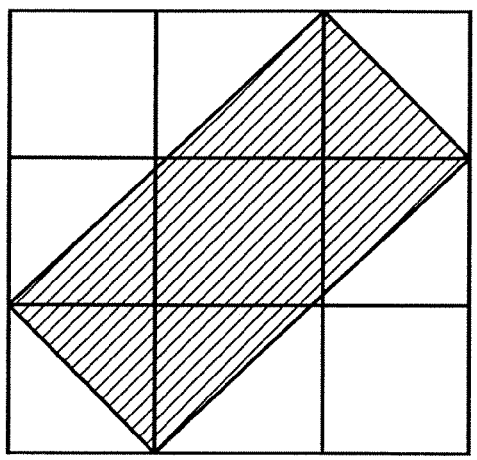
MODE-2

F I G. 14
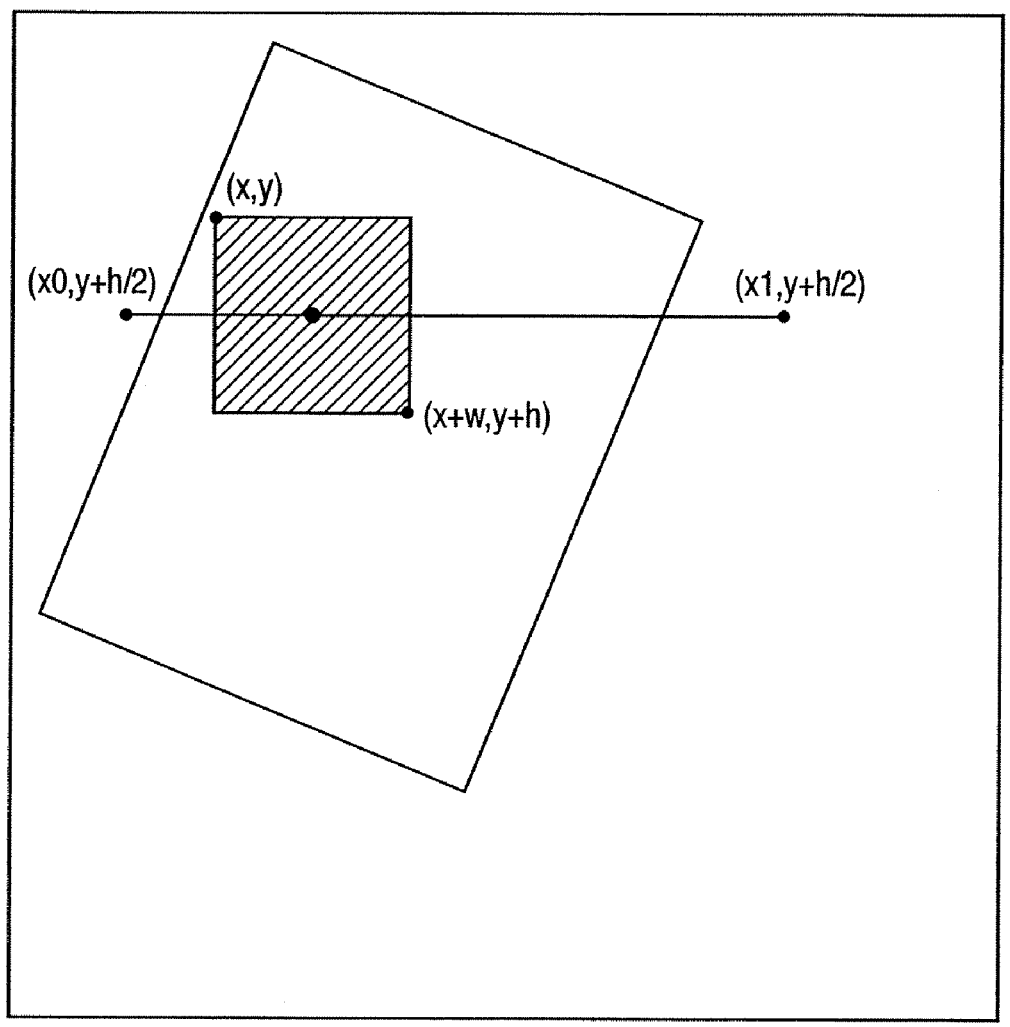

NUMBER OF
THE WHITE PIXELS

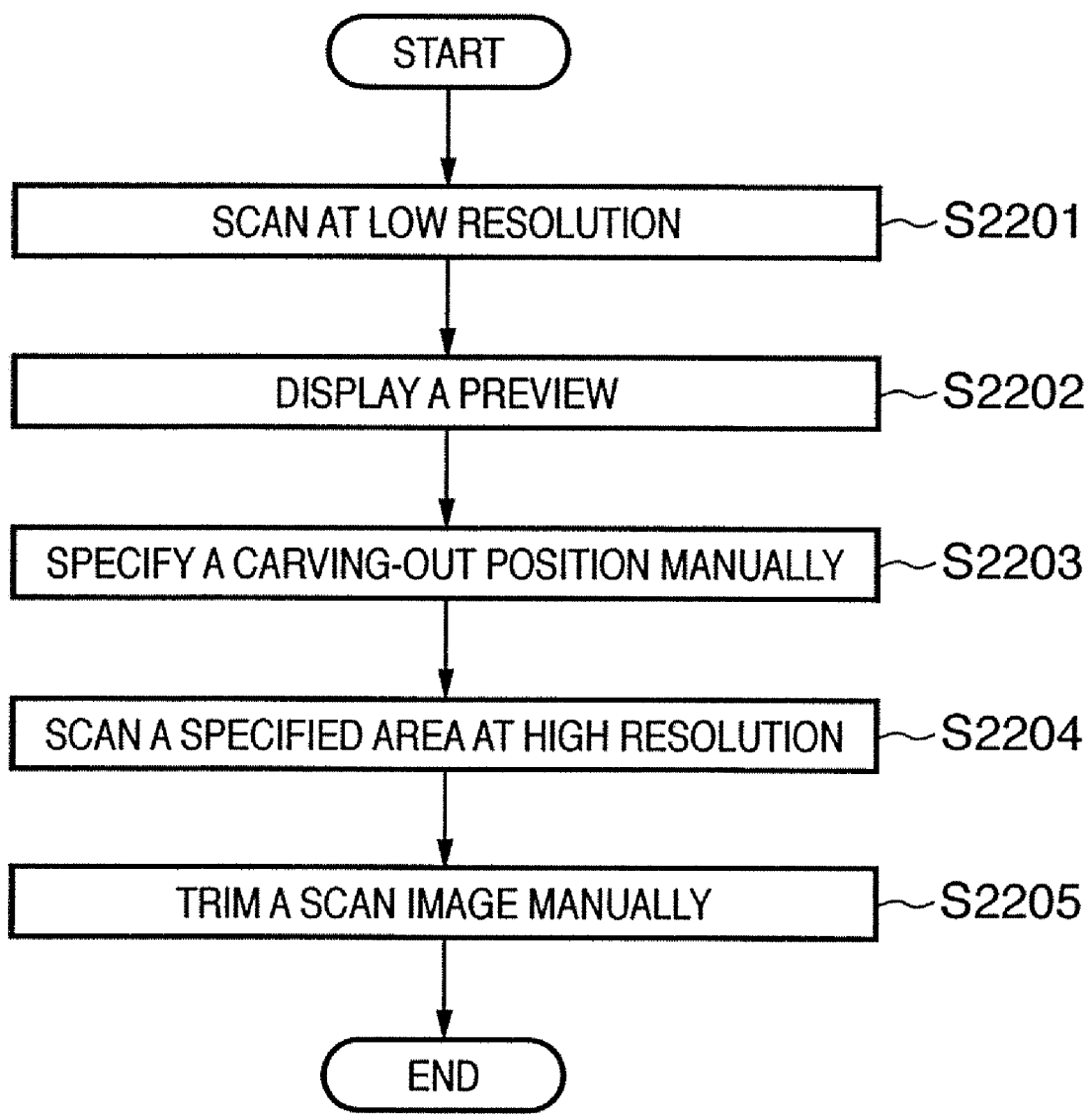

APPARATUS AND METHOD FOR IMAGE PROCESSING

CROSS REFERENCE TO RELATED APPLICATION

This application is a Divisional of U.S. application Ser. No. 10/375,195, filed on Feb. 28, 2003, the entire disclosure of which is incorporated by reference herein.

BACKGROUND OF INVENTION

This invention relates to an image processing method and an image processing apparatus, and more particularly, to an image processing method and image processing apparatus for detecting a rectangular image.

Various algorithms have been proposed so far for the sake of detecting and carving out a rectangular area from an original image. For instance, Japanese Patent Laid-Open No. 8-237537 has a technology described wherein an outline is extracted first and the rectangular area detected by looking for a portion of the outline constituting a straight line.

According to the conventional algorithms for carving out a rectangle, however, it was difficult, in an environment of plenty of noise, to detect a straight line portion of a rectangular outline and to further detect one rectangle by associating four straight lines. Therefore, it was difficult to accurately carve it out so that precision of the results of carving it out was not sufficient.

SUMMARY OF THE INVENTION

Accordingly, it is an object of the present invention to provide an image processing method and an image processing apparatus capable of detecting a rectangular area with high precision even in an environment of plenty of noise.

According to the patent invention, the foregoing object is attained by providing an image processing method for detecting a rectangular area from an image, comprising: a histogram creation step of creating histograms of the numbers of horizontal and vertical black pixels of a binary image made by binarizing an original image; a rectangle extent detection step of performing trapezoidal approximation to the histograms so as to detect an extent of the rectangular area in said binary image; and an inclination direction detection step of detecting an inclination direction of said rectangular area in said.

It is another object of the present invention to provide the image processing method further comprising a labeling step of labeling said binary image, and wherein said histogram creation step creates the histogram having the number of said labeled pixels.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a flowchart showing a trapezoidal approximation method of the histogram according to the embodiment;

FIG. 7 is a diagram showing four bias filling modes according to the embodiment;

FIG. 14 is a diagram showing a combined line segments filling process according to the third embodiment;

FIG. 22 is a flowchart showing a process by a general image scan application.

DETAILED DESCRIPTION OF THE PREFERRED EMBODIMENTS

Figure 1:
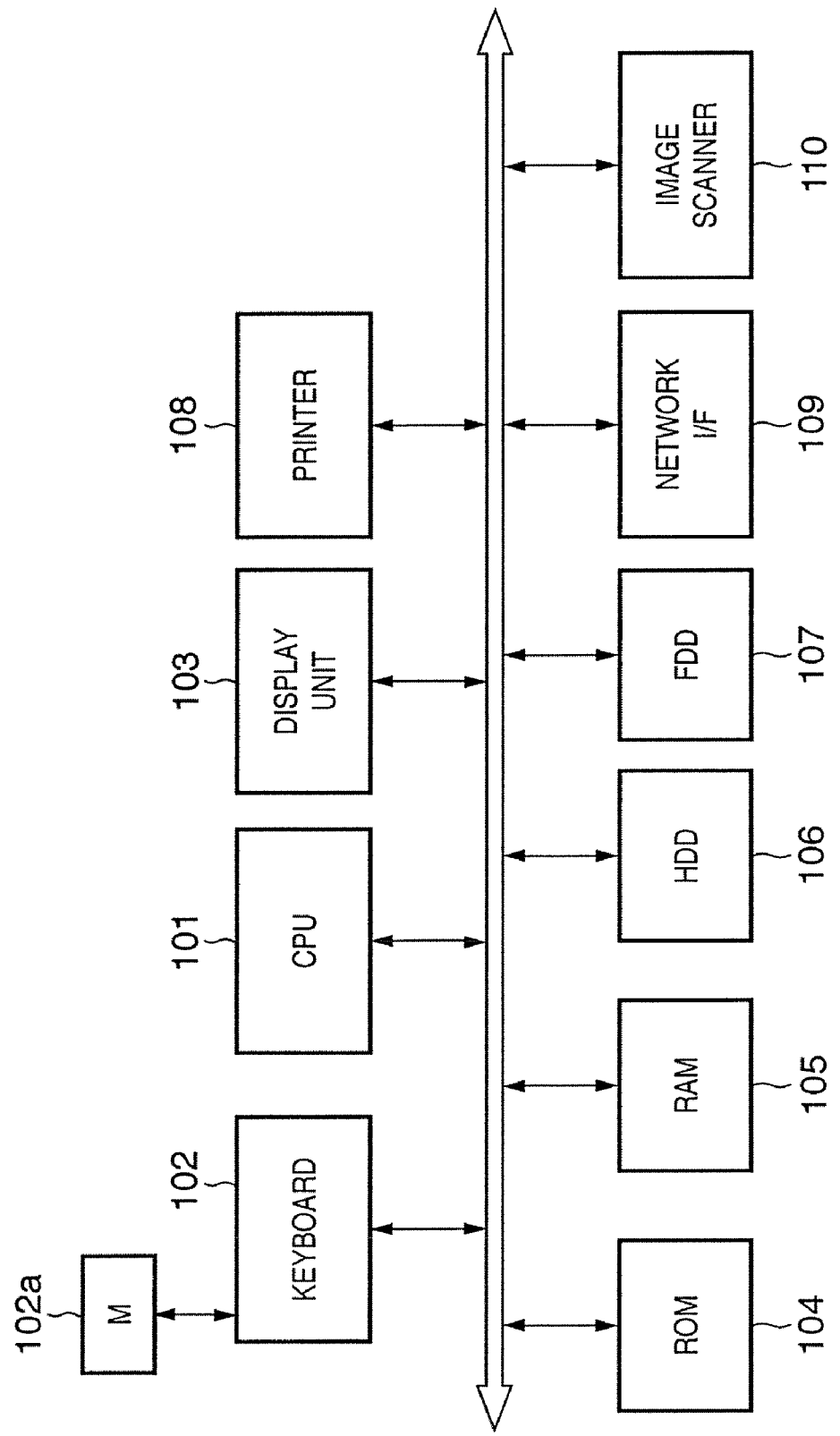
FIG. 1 is a block diagram showing an overview configuration of an image processing system according to an embodiment of the present invention.

Preferred embodiment of the present invention will now be described in detail in accordance with the accompanying drawings.

Hereafter, each embodiment according to the present invention is described in detail by referring to the drawings.

First Embodiment

System Configuration

FIG. 1 is a block diagram showing a configuration of a computer system on which the present invention is implemented. Reference numeral 101 denotes a CPU for controlling the entire system. Reference numeral 102 denotes a keyboard used for data input to the system together with a mouse of 102a. Reference numeral 103 is a display unit comprised of a CRT, a liquid crystal and so on. Reference numeral 104 denotes an ROM and 105 denotes an RAM which constitute a storage unit of the system and store a program to be executed by the system and data to be used by the system. Reference numeral 106 denotes a hard disk drive (HDD) and 107 denotes a floppy disk drive (FDD) which constitute external storage components to be used for a file system of the system. Reference numeral 108 denotes a printer.

Reference numeral 109 denotes a network I/F connected to an LAN or a WAN.

It is possible, via the I/F 109, to exchange a data file such as a computer program or a digital image with another computer. The program and data are recorded on the hard disk 106 or directly rendered to the RAM 105 and executed.

Reference numeral 110 denotes an image scanner capable of reading a photo and printing on a document glass and capturing them as a multivalic digital image onto the RAM 105.

Overview of the Rectangular Image

Figure 2:
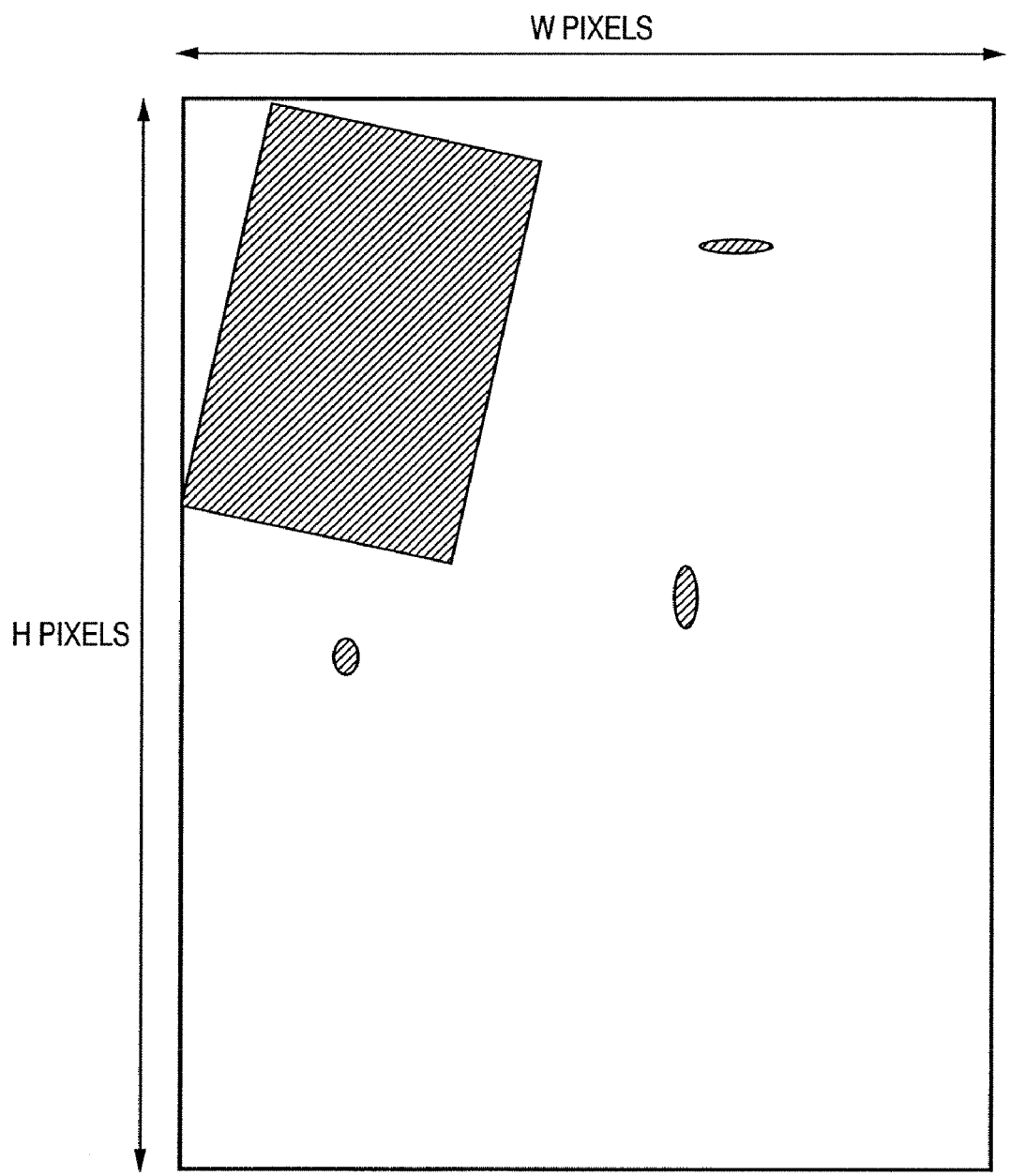
FIG. 2 is a diagram showing an example of a binary image to be detected according to the embodiment.

FIG. 2 shows an example of the image captured from the image scanner 110 and binarized. The rectangle in the drawing represents a rectangular manuscript image (hereafter, referred to as a rectangular image) such as a photo, and three ellipses represent noise. While this drawing shows the noise simplified for the sake of explanation, the noise in reality is of indeterminate size and shape, and the number thereof is often a few hundred to a few thousand pieces. As for binarization of the image, a known simple binarization method by means of comparison with a predetermined threshold is used, and a detailed description thereof is omitted here.

The image shown in FIG. 2 is held as a bitmap W pixels wide and H pixels high on the RAM 105. Each pixel is 1 byte deep, and a black pixel is indicated by a value 255 while a white pixel is indicated by a value 0. The bitmap on the RAM 105 is accessible as a two-dimensional array, where the pixel located horizontally at an i-th position and vertically at a j-th position starting from the upper left of the bitmap is expressed as buf(i,j). According to this embodiment, a coordinate of the area in which the rectangular image exists is identified from this bitmap by the following method.

Histogram Creation

Figure 3:
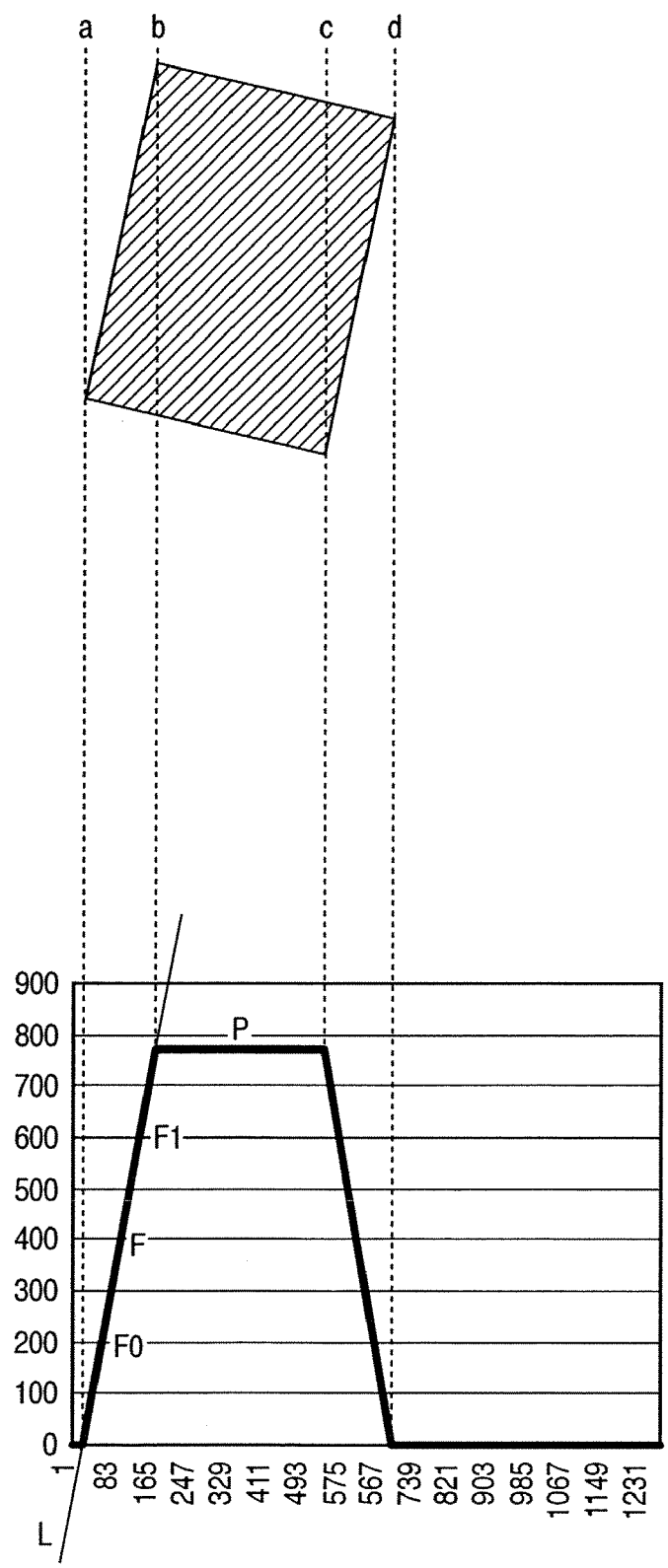
FIG. 3 is a diagram showing an example of a horizontal histogram of the number of black pixels according to the embodiment.

FIG. 3 is a diagram for, when assuming an ideal state of no noise existing in the binary image shown in FIG. 2, showing an appearance of a histogram of the number of black pixels counted horizontally, and the upper part of the diagram shows the binary image and the lower part shows the example of the histogram. It is understandable from this drawing that the histogram approximately forms a trapezoid by corresponding to four vertexes of the rectangle of the binary image. While the histogram will not be a perfect trapezoid since the binary image in reality includes the noise, it is possible, from the trapezoidal shape of this histogram, to obtain sufficient information to identify the positions of the horizontal vertexes.

Figure 4:
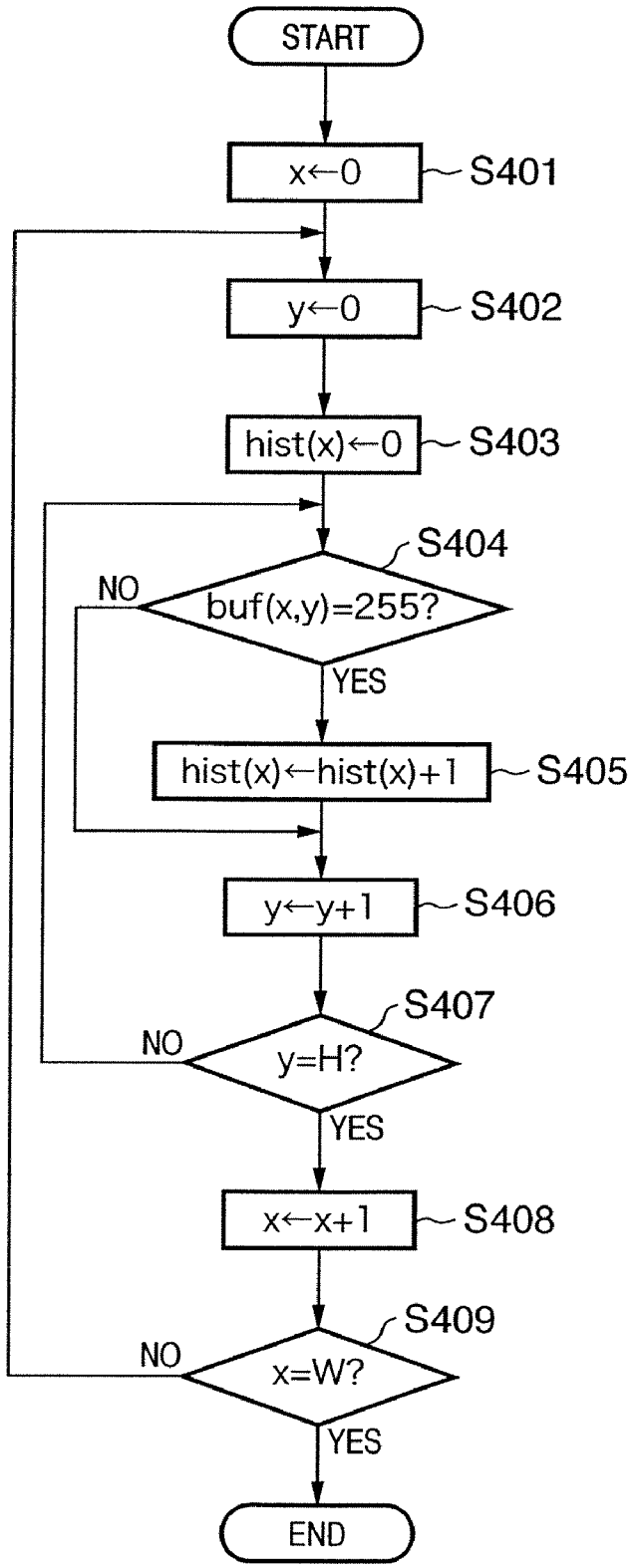
FIG. 4 is a flowchart showing a histogram calculation process according to the embodiment.

FIG. 4 is a flowchart showing a creation process of the histogram shown in FIG. 3. Hereafter, an array for storing histogram data is indicated as histo.

First, 0 is assigned to each of variables x and y in steps S401 and S402, and 0 is assigned to a variable hist(x) in a step S403.

A pixel buf (x,y) on the bitmap is compared to the value 255 in a step S404. If the pixel and the value 255 are different, the process proceeds to a step S406. If they are equal, the process moves on to a step S405 and increments hist(x) by just a value 1, and then moves on to the step S406.

The variable y is incremented by just a value 1 in the step S406 and is compared to the bitmap height H next in a step S407 next. If y and H are different, the process returns to the step S404. If equal, the process moves on to a step S408 and increments the variable x by just 1, and compares x to the bitmap width W in a step S409. If x and W are different, the process returns to the step S402. If equal, the process terminates.

Vertex Detection Process

The array hist( ) of the histogram of the number of black pixels counted can be obtained by the above process. As shown in FIG. 3, the histogram forms the trapezoid surrounded by an X-axis and three straight lines. As for the trapezoid in this embodiment, the position at which the left side crosses the X-axis is a, the position at which the left side crosses the upper base is b, the position at which the right side crosses the upper base is c, and the position at which the right side crosses the X-axis is d.

Here, a description is given using the flowchart in FIG. 5 of a method of seeking the positions a, b by analyzing the left side of the trapezoid presented by the histogram.

First, in a step S501, a peak point P at which hist (x) is maximum is detected. In the histogram shown in FIG. 3, there is a peak of height 800 around X=400. Next, in a step S502, a point F of half the height of the peak is detected forward of the point P. In the histogram shown in FIG. 3, the position before or after X=100 is equivalent to the point F. And a point F0 of ¼ of the height of the peak is detected forward of the point F in a step S503. Furthermore, a point F1 of ¾ of the height of the peak is detected backward of the point F in a step S504.

Next, in a step S505, linear approximation is performed by using a known regression analysis as to all the points of F0≦X≦F1 so as to obtain a straight line L as shown in FIG. 3. The point at which the straight line L crosses the X-axis is calculated in a step S506, which point is obtained as a. The point at which the straight line L becomes 98 percent of the height of the peak P is calculated in a step S507, which point is obtained as b. This is for the purpose of considering that the peak P includes the noise and is more than the actual peak, correcting it to be 98 percent.

The foregoing description with reference to the flowchart shown in FIG. 5 pertains to an example of performing a search forward of the peak P and thereby obtaining the points a, b. Likewise, the points c, d can be obtained by performing a search backward of the peak P.

Figure 6:
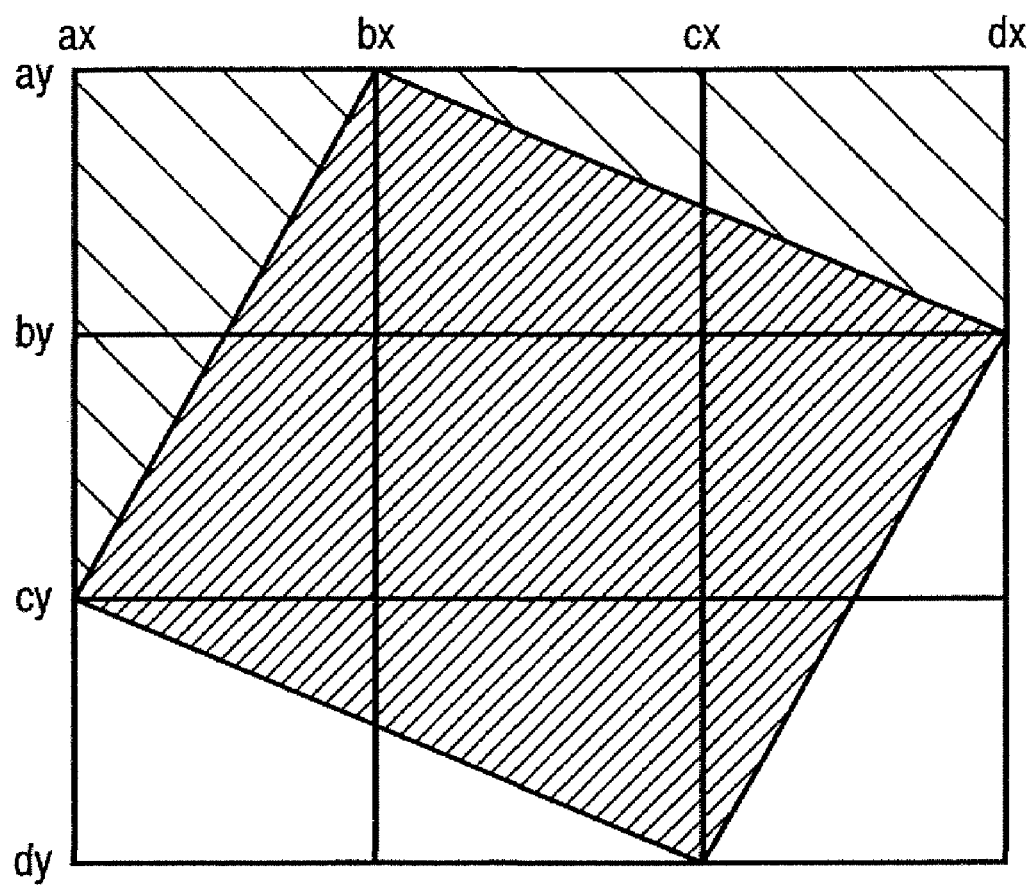
FIG. 6 is a diagram showing an example of a detected coordinate of a rectangular image according to the embodiment.

Moreover, while the foregoing description pertains to horizontal vertex position detection, it is possible to perform vertical vertex position detection by reversing vertical and horizontal axes in the description and applying exactly the same method. It is thus possible, as shown in FIG. 6, to obtain four coordinate values, vertical and horizontal, surrounding the rectangle respectively, that is, eight variables (ax, bx, cx, dx, ay, by, cy and dy) as vertex candidates.

Here, the eight variables are uniquely determined from the rectangle, yet the rectangle cannot be inversely determined from the eight variables. To be more specific, four types of vertex coordinates can be generated from these eight variables according to bias filling directions (hereafter, referred to as bias filling modes) thereof as shown in FIG. 7, so the correct rectangle cannot be uniquely determined. In FIG. 7, a special case (not shown) where the rectangle is completely horizontal is a mode 0, and the four bias filling modes are modes 1, 2, −1 and −2 respectively. As histograms of the same shape are generated from the images shown in these modes, it is necessary to determine the bias filling modes by a method other than the histogram.

Bias Filling Mode Determination

Hereafter, a bias filling mode determination process according to this embodiment is described in detail.

While the above-mentioned FIG. 6 is equivalent to the state of the mode 1 shown in FIG. 7, it is considered that, in the case of counting the black pixels existing inside two triangular areas shown by diagonal lines in FIG. 6, the results of counting the black pixels become 0 because ideally the black pixels (dotted portion in the drawing) are not included. Hereafter, the areas shown by the diagonal lines shown in FIG. 6 are called the template of the mode 1. Likewise, as for the other modes shown in FIG. 7, the two triangular areas existing in the upper portion of the rectangle are the template of each mode.

Figure 8:
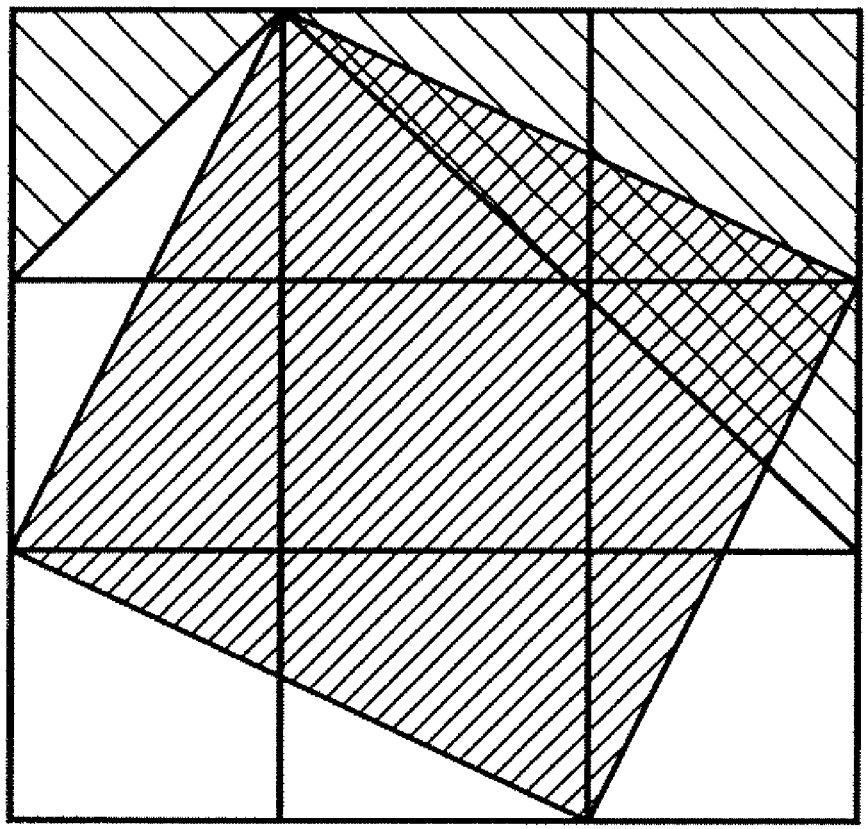
FIG. 8 is a diagram for explaining a principle of determination of a bias filling mode according to the embodiment.

Here, as shown in FIG. 8, if the template (the portion of diagonal lines in the drawing) of the mode 2 is applied to the rectangular image (dotted portion in the drawing) which is in reality mode 1, the rectangular portion extends into the inside the template, so the black pixel count does not become 0. According to this embodiment, this characteristic is utilized to determine the bias filling mode of the rectangle.

To be more precise, counting is performed as to the numbers of black pixels in the templates in the case of applying the templates of the four modes respectively, and the template having the smallest resulting black dot count is determined as the bias filling mode of that image. To be more specific, the smallest degree of intrusion into the template is the degree of the bias filling at which the rectangular image becomes most approximate. As a matter of course, it is also possible to count the number of black pixels existing outside the templates so as to determine the bias filling mode according to the largest resulting black dot count.

The above processing can identify the four vertex coordinates of the rectangular area in the binary image. Therefore, it is possible, by performing known bias filling correction and image carving-out processes to the original image based on this information, to carve out a rectangular photo image placed on the image scanner 110 for instance.

As for the known bias filling correction process, it is desirable to use simple interpolation (nearest neighbor method) or linear interpolation (bilinear method), which should be chosen according to use considering that the former is speedier and the latter provides better image quality.

As described above, it is possible, according to this embodiment, to detect the rectangular area precisely even in the environment of plenty of noise.

If the rectangular area is a perfect rectangle, the trapezoid of which right and left hypotenuses are symmetric should be presented as an ideal histogram. However, there are the cases in which, due to the influence of the noise, the right and left hypotenuses are not symmetric, that is, the distance between a and b shown in FIG. 3 is not equal to the distance between c and d. In such cases, trapezoidal approximation is performed according to the data obtained from the hypotenuse considered to be less influenced by the noise. To be more specific, precision (square error between the straight line and actual data) of the linear approximation by the regression analysis should be compared as to the right and left hypotenuses so as to adopt the one having a less error.

Likewise, it is also possible that the rectangular form linking the four vertexes obtained as a result of rectangle detection does not necessarily become the rectangle due to the influence of the noise and adjacent sides are not orthogonal. In such cases, a correction should be made to the rectangular form so that it becomes the rectangle based on the data presumably less influenced by the noise, and thus the precision of the rectangle detection can be improved.

Second Embodiment

Hereafter, a second embodiment of the present invention is described. The system configuration of the second embodiment is the same as that of the above-mentioned first embodiment, and so a description thereof is omitted.

A case in which one rectangular area exists in the image was described in the above-mentioned first embodiment. As for such a situation, for instance, an assumption can be made about the process wherein a scan is performed in a state of not necessarily horizontally placing a photo on the document glass of the image scanner 110, and the photo image is extracted thereafter by automatically correcting the bias filling and carving out the image.

However, the document glass of a general flat head scanner allows placement of a document of A4 size or so, and so a plurality of general photos (so-called L-version size) can be placed thereon at once. Therefore, scanning can be rendered more efficient if it is possible to read the plurality of photo images by scanning once and carving out only the rectangular areas showing the photo images from the obtained images.

Thus, the second embodiment is characterized by detecting a plurality of rectangular images from one image.

Figure 9:
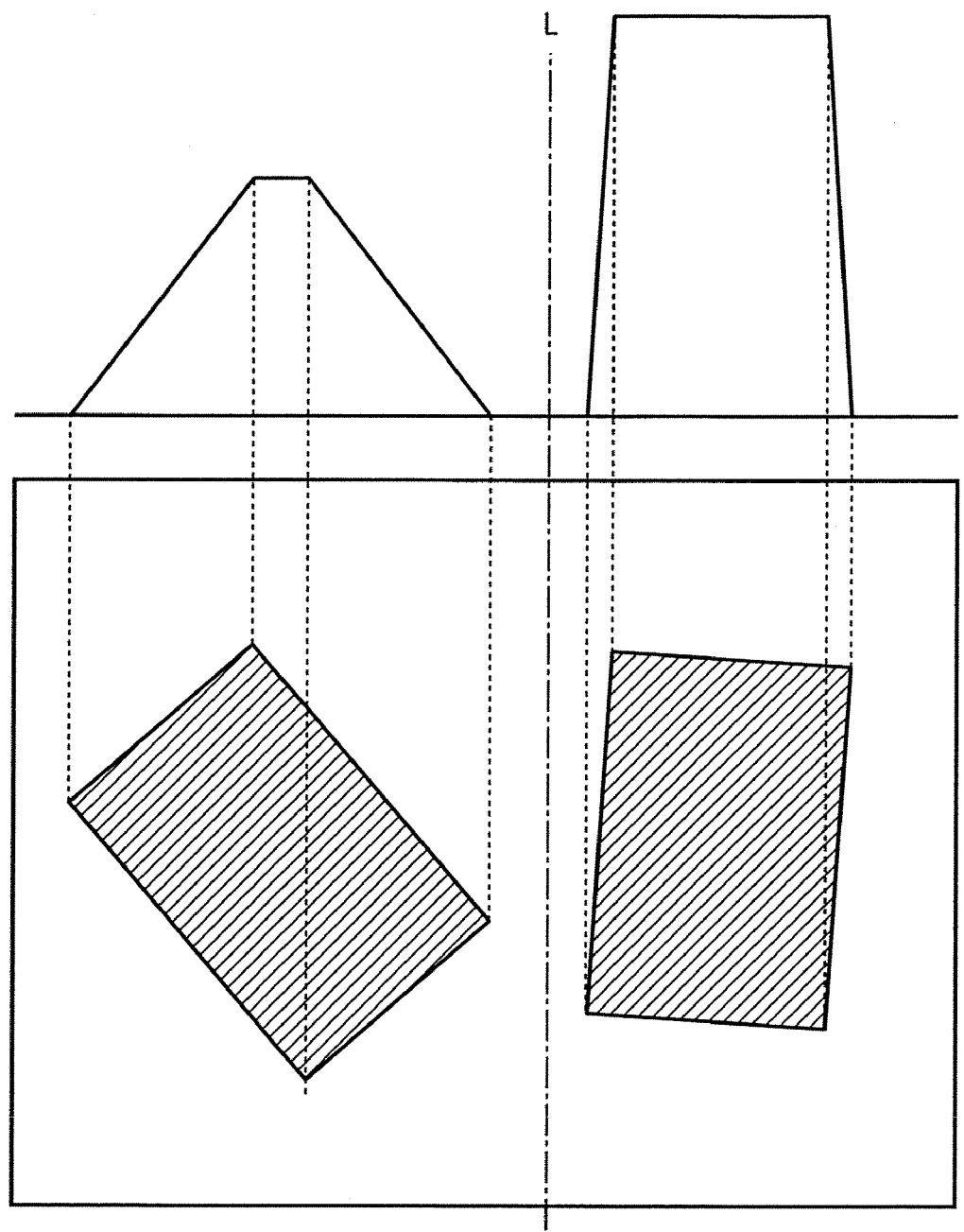
FIG. 9 is a diagram showing an appearance of the histogram when a plurality of photos are placed according to a second embodiment.

Hereafter, a description is given by referring to FIG. 9 of the process of detecting a plurality of rectangular images according to the second embodiment. The left portion of FIG. 9 shows a binarized image on separately placing two photos on the document glass in a vertical scanning direction (longitudinal direction in the drawing), and the right portion thereof shows the appearance of the histogram in the vertical scanning direction of the binarized image. As is clear from the drawing, in the case in which a plurality of photos are separately placed, a plurality of trapezoids appear on the histogram. Therefore, according to the second embodiment, this histogram is referred to so as to cut the image into two between the plurality of trapezoids, that is, at the position indicated by a dashed line L in FIG. 9. Then, it is possible thereafter, by the method shown in the above-mentioned first embodiment, to detect the rectangular images in each of the cut areas respectively.

The case of separately placing the plurality of photos in the vertical scanning direction was described as to FIG. 9. Likewise, it also is possible, in the case of separately placing them in a horizontal scanning direction (latitudinal direction in the drawing) to cut the image in the horizontal scanning direction and extract each rectangular image by creating the histogram as to the horizontal scanning direction.

As described above, according to the second embodiment, it is possible to detect a plurality of rectangular images from one image.

Third Embodiment

Hereafter, a third embodiment of the present invention is described. The system configuration of the third embodiment is the same as that of the above-mentioned first embodiment, and so a description thereof is omitted.

An image processing method according to the third embodiment is characterized by, as to the binary image shown in FIG. 2, detecting as a black block a predetermined-size block having the number of the black pixels exceeding a predetermined ratio therein and replacing the black pixels in the detected block and those coupled thereto with a predetermined label value so as to eliminate the influence of the noise and detect the rectangular images with higher precision.

Here, an ideal labeling process of the binary image shown in FIG. 2 is, based on mutual connections of the black pixels, to give a pixel value 1 to every pixel included in the upper rectangular object and give a pixel value 2 to every pixel included in the lower rectangular object, for instance. To be more specific, a label is not given to a minute noise portion so as to leave it as-is at the pixel value 255.

Labeling Process Overview

Hereafter, a labeling method for implementing the ideal labeling is described in detail.

A variety of so-called labeling algorithms for labeling each object of the binary image have been proposed so far. However, a general binary image includes a minute noise area that is not the object and thus does not primarily need to be labeled, as a matter of course. Therefore, also from the viewpoint of processing time, it is desirable to exert control so as to allocate no label to the minute noise area in the image.

To implement the control, for instance, it is possible to eliminate known isolated points as preprocessing of the labeling, thereby decreasing the noise in the image and avoiding wasteful labeling so as to speed up the labeling.

However, even if the isolated points are eliminated as the preprocessing of the labeling, it has not been possible to eliminate the noise not completely isolated and having a few pixels or so connected thereto. Therefore, the problem of allocating a label to the minute noise area has not been completely solved.

As for a labeling speedup method, the method described in Japanese Patent Laid-Open No. 2000-285240, for example, has been proposed. According to this method, a general filling algorithm is used to fill a connection area of the black pixels, and then one label is allocated to the filled area. The filling and label allocation processes are repeated so that the labeling is performed to all the images. This method is characterized in that, when the number of the filled pixels is small, the area is not labeled and the process is skipped since it is supposedly an isolated and minute noise area. This characteristic is instrumental in eliminating redundant label allocation.

However, even the labeling method described in Japanese Patent Laid-Open No. 2000-285240 requires the process of filling the connection area to be performed to all the black pixels. Therefore, there is a limit to the speedup of the labeling, particularly in the case of an image having plenty of noise.

Thus, an object of the third embodiment is to provide an image processing apparatus for implementing a high-speed labeling process in which the effect of noise has been eliminated, and the method thereof, so as to solve the problem of the conventional art.

Figure 10:
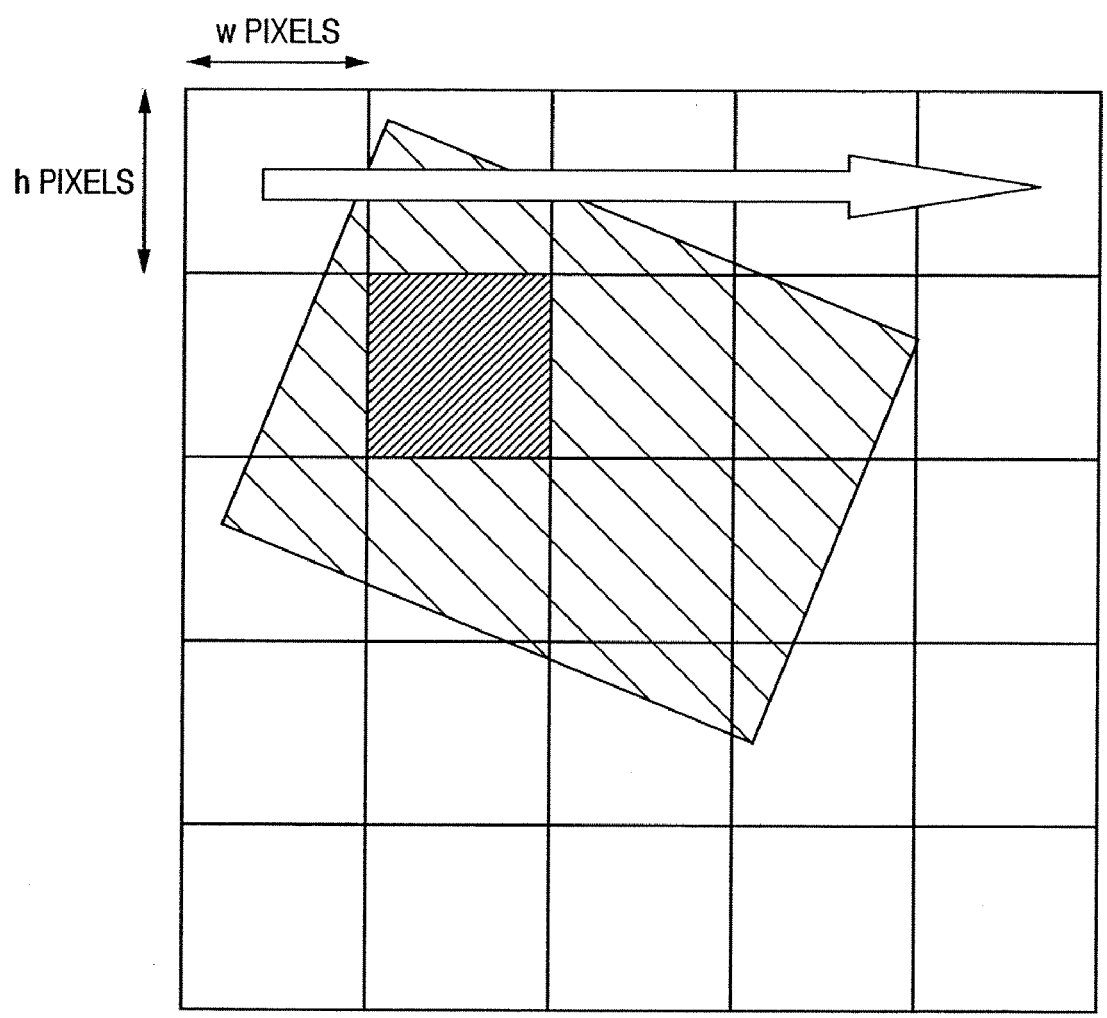
FIG. 10 is a diagram for explaining a black block searching method according to a third embodiment.

FIG. 10 is a diagram for explaining a method of searching for a block which is corresponding to the upper left portion including the rectangular object in the upper part in FIG. 2 and is a starting point of the filling process of the third embodiment.

First, as shown in FIG. 10, the entire bitmap of W pixels×H pixels shown in FIG. 2 is divided into blocks of w pixels×h pixels, and the block having its inside completely occupied by the black pixels of the value 255 (hereafter, referred to as "black block") is searched for in the direction of the arrow in the drawing. The block shown as a black rectangle in FIG. 3 is the discovered black block.

Figure 11:
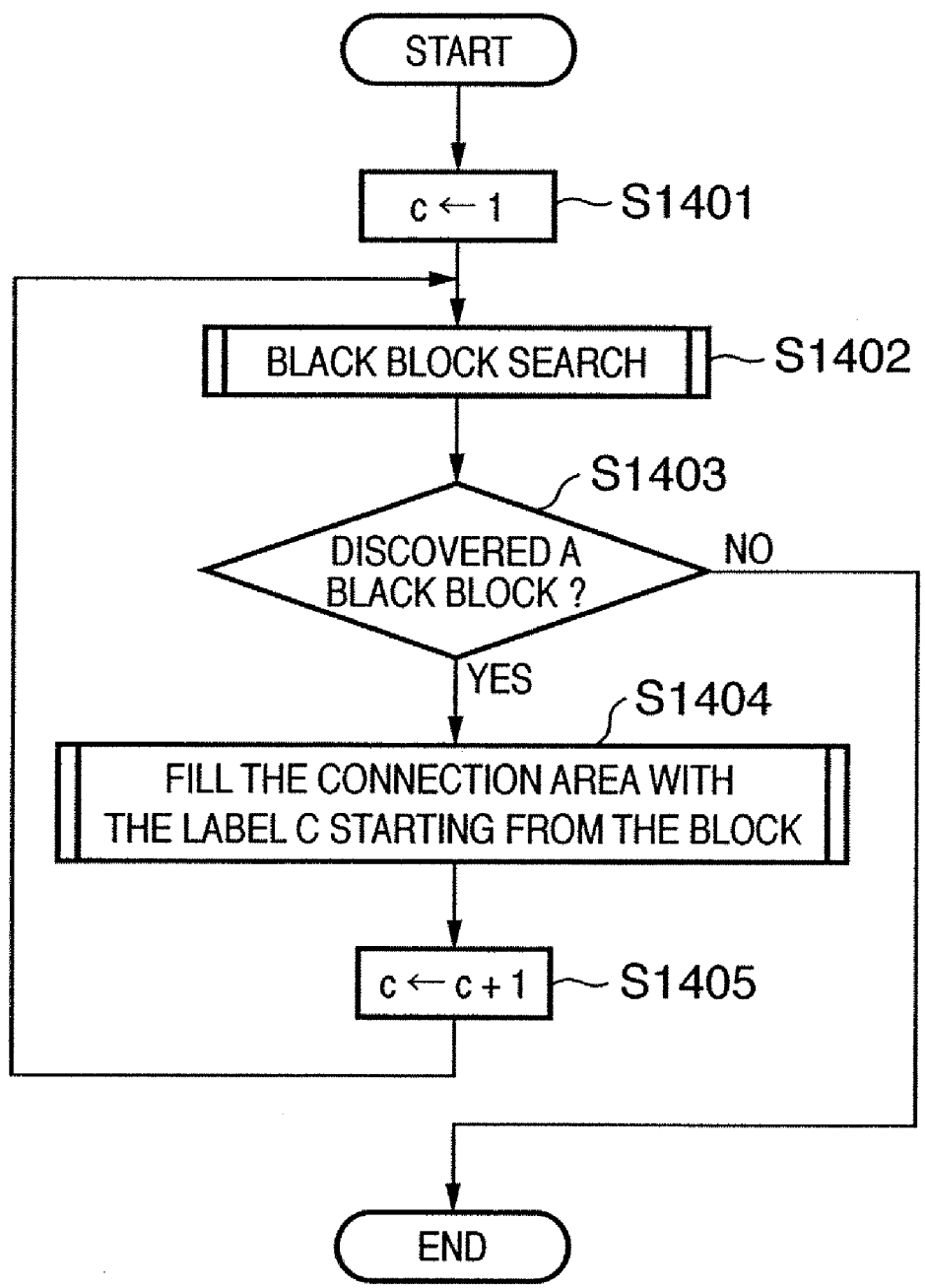
FIG. 11 is a flowchart showing an overview of a labeling process according to the third embodiment.

According to the third embodiment, high-speed labeling is implemented by filling the area in which the black pixels are connected to the discovered black block. FIG. 11 shows a flowchart of the entire labeling process according to the third embodiment, and a description thereof is given.

First, the value 1 is assigned to the variable c in a step S1401, and a black block search is performed in a step S1402. The black block search process is described in detail later.

Next, in a step S1403, it is determined whether or not a black block is discovered. If discovered, the process moves on to a step S1404. If not discovered, the process ends.

In step S1404, the black pixel connection area is filled with the label c starting from the discovered black block. The filling process is described in detail later.

The variable c is incremented by just 1 in a step S1405, and then the process returns to a step S1402 to repeat the above processing.

As a result of this processing, it is possible to provide the labels 1, 2, . . . , c only to those objects which are of a predetermined size or larger.

Black Block Search Process

Figure 12:
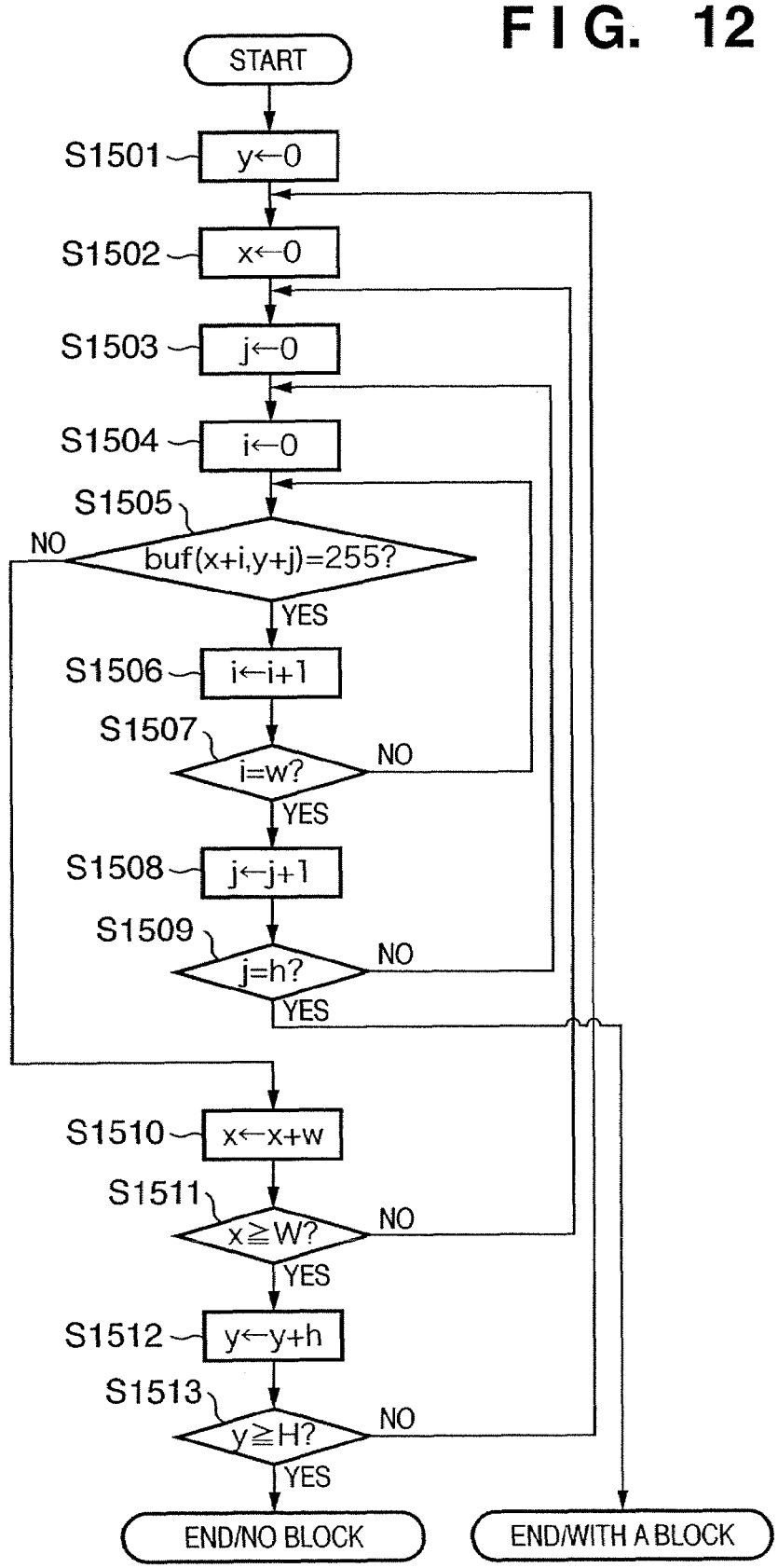
FIG. 12 is a flowchart showing a black block searching process according to the third embodiment.

Hereafter, the flowchart in FIG. 12 shows the details of the black block search process shown in the step S1402 in FIG. 11, and a description thereof is given.

First, variables y, x, j and i are initialized with the value 0 in steps S1501 to 1504 respectively. In a step S1505, it is determined whether or not buf(x+i, y+j) is 255 indicating the presence of a black pixel. If it is 255, the process proceeds to a step S1506. If not, the process moves on to a step S1510.

The variable i is incremented by just 1 in a step S1506. If i is equal to w indicating a block width in a step S1507, the process moves on to a step S1508. If different, the process moves on to step S1505.

The variable j is incremented by just the value 1 in the step S1508. If j is equal to h, indicating a block height in a step S1509, the process ends. At this time, the block of w×h pixels, of which upper left starting point is (x, y), is detected as the blackblock. If j is different from h, the process returns to the step S1504.

In the step S1510, w is added to x. In a step S1511, if x is equal to or larger than W indicating an image width, the process proceeds to a step S1512. If not, the process returns to the step S1503.

In the step S1512, h is added to y. In a step S1513, if y is equal to or larger than H indicating an image height, the process terminates, and at this time, it is determined that no black block exists. If y is smaller than H, the process returns to the step S1502.

The black block of w×h pixels is detected from the binary image of W pixels×H pixels by the above processing.

Connection Area Filling Process

Figure 13:
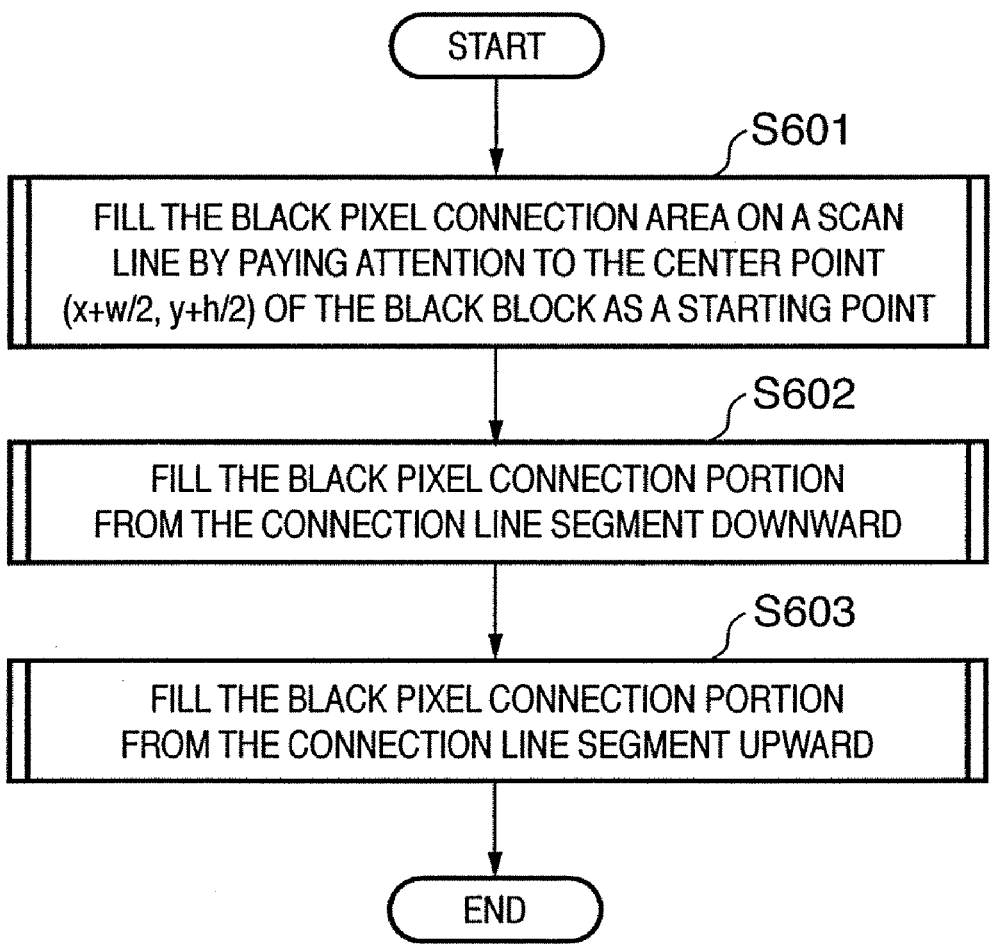
FIG. 13 is a flowchart showing a filling process according to the third embodiment.

The flowchart depicted in FIG. 13 shows the details of the connection area filling process shown in the step S1404 in FIG. 11, a detailed description of which is now given.

Various methods are known as an object filling process, and any filling method may be used according to the third embodiment. Therefore, a basic method is described here, and it is assumed for the sake of simplified description that the object is a simple shape which is externally convex.

As a result of the above-mentioned black block search process, the block of which the upper left starting point is (x, y) is detected as the black block as shown in FIG. 14. FIG. 14 is a diagram showing a combined line segments filling process according to the third embodiment. Thus, in the filling process according to the third embodiment, the area connected with the black pixels is filled with the label c from ((x+w) /2, (y+h) /2) which is the center point of the black block as the starting point. To be more specific, the pixel value which is the value 255 is replaced by the value c.

That is, first, the black pixel connection area on a scan line including the center point ((x+w)/2, (y+h)/2) of the black block is filled with the label c in a step S601. Thus, filling with the label c is performed to the line segment (line segment for horizontally cutting the object in FIG. 14) connecting the left end (x0, y+h/2) to the right end (x1, y+h/2) of the scan line in the object including the black block in FIG. 14. The line segment connecting (x0, y+h/2) to (x1, y+h/2) is referred to as a connection line segment hereafter, and the filling process thereof is described in detail later.

The black pixel connection portion from the connection line segment downward is filled in a step S602, and the black pixel connection portion from the connection line segment upward is filled in a step S603. The filling process in the steps S602 and S603 is described in detail later.

As a result of this process, it is possible to fill with the label c the area connected to the black block by the black pixels.

Connection Line Segment Filling Process

Figure 15:
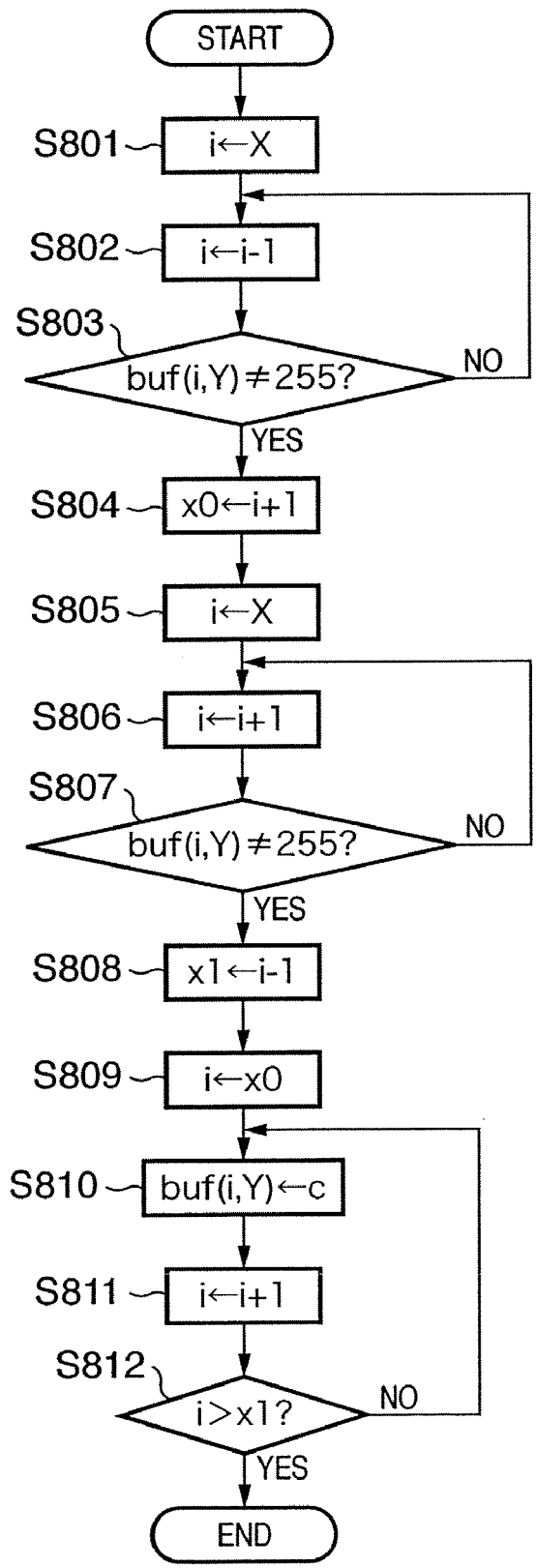
FIG. 15 is a flowchart showing the combined line segments filling process according to the third embodiment.

Hereafter, the flowchart in FIG. 15 shows the details of the connection line segment filling process shown in the step S601 in FIG. 13, and a description thereof is given. To simplify the description, the center point ((x+w)/2, (y+h)/2) of the black block which is the starting point of the process is indicated by coordinates (X, Y). That is, X=(x+w)/2, Y=(y+h)/2.

First, X is assigned to the variable i in a step S801, and i is decremented by the value 1 in a step S802. It is determined whether or not buf(i, Y) is equal to the value 255 in a step S803, and if different, the process proceeds to a step S804. If equal, the process returns to the S802 to further decrement i.

A value i+1 is stored in a variable x0 in the step S804, and X is assigned to the variable i in a step S805, i is incremented by 1 in a step S806, It is determined whether or not buf(i, Y) is equal to the value 255 in a step S807. If they are equal, the process proceeds to a step S808. If different, the process returns to the S806 to further increment i.

A value i−1 is stored in a variable x1 in the step S808, a value x0 is assigned to the variable i in a step S809, and c is assigned to buf(i, Y) in a step S810. And i is incremented by just 1 in a step S811. The process terminates if i is larger than x1 in a step S812. If not, the process returns to the step S810.

It is possible, by this process, to store x coordinates at both ends of the connection line segment in the variables x0, x1 and fill the connection line segment with the label c.

Filling Process from the Connection Line Segment Downward (Upward)

Figure 16:
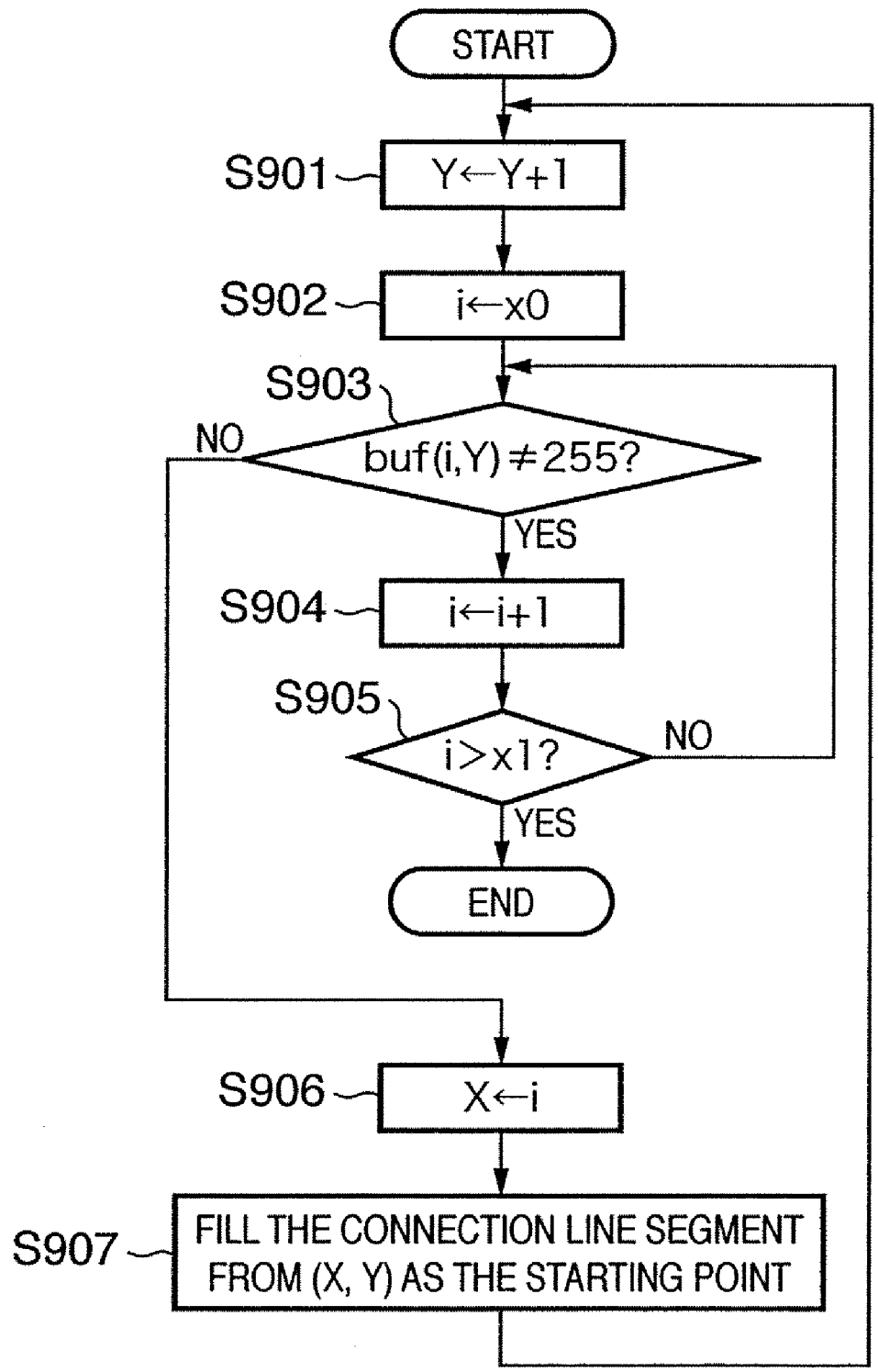
FIG. 16 is a flowchart showing a process of filling an area under combined line segments according to the third embodiment.

The flowchart in FIG. 16 details the filling process from the connection line segment downward shown in the step S602 in FIG. 13, and a description thereof is given. It is also Y=y+h/2 here, and so the black pixel connection portion from the connection line segment connecting (x0, Y) to (x1, Y) downward is filled with the label c.

First, the variable Y is incremented by just 1 in a step S901, and x0 is assigned to the variable i in a step S902. It is determined whether or not buf(i, Y) is equal to the value 255 in a step S903, and if different, the process proceeds to a step S904. If equal, the process proceeds to a step S906.

The variable i is incremented by just 1 in the step S904. If i is larger than x1 in a step S905, the process terminates. If not, the process returns to the step S903.

In a step S906, i is assigned to X, and the connection line segment which is horizontal, that is, on the scan line, is filled starting from (X, Y) in a step S907. The filling process on the scan line is shown in the flowchart in FIG. 15, and so a detailed description thereof is omitted here.

As for the filling process of the black pixel connection portion from the connection line segment upward shown in the step S603 in FIG. 13, it is basically the same as the downward filling process shown in the flowchart in the above-mentioned FIG. 16, where Y is decremented instead of being incremented and the same processing is performed in the other steps.

According to the labeling process described above, it is possible to label only the objects that include predetermined-size black blocks, that is, the objects which have a predetermined size or larger area. Therefore, no minute noise area is labeled and so that high-speed labeling becomes possible.

Rectangle Detection after Labeling

According to the above labeling process, in the two-dimensional array of buf( ) shown in FIG. 2, the pixel value 1 as a label 1 is stored for every pixel included in the rectangular object in the upper portion of the drawing, the pixel value 2 as a label 2 is stored for every pixel included in the rectangular object in the lower portion of the drawing, the pixel value 255 is stored for the black pixel in any other minute noise area, and the value 0 is stored for the white pixel in the background respectively.

According to the third embodiment, the position of the rectangular object (vertex coordinate) is determined for each label area. To be more specific, the rectangle detection process described in the above-mentioned first and second embodiments is performed on the image after the labeling. That is, in the histogram creation flowchart shown in the above-mentioned FIG. 4, the comparison subject of buf( ) shown in the step S404 is changed from the value 255 indicating the black pixel to a label value (1 or 2 in this case). The areas of the label 1 and label 2 are thereby detected as the rectangles.

As can be appreciated by those of ordinary skill in the art, although the foregoing description assumes two rectangles as an example, it is of course possible to perform the above labeling process on a binary image including an arbitrary number of rectangles, performing the rectangle detection process for each label.

As described above, according to the third embodiment, it is possible to eliminate the effect of noise and detect a rectangular image with higher precision by performing the ideal labeling process to the binary image.

Fourth Embodiment

Hereafter, a fourth embodiment of the present invention is described. The system configuration of the fourth embodiment is the same as that of the above-mentioned first embodiment, and so a description thereof is omitted.

According to the above-mentioned third embodiment, when searching for the black block in the binary image, the entire binary image is divided into the blocks and then it is checked whether or not all the pixels inside each block are black pixels. However, there are also other methods that can be used as the black block search method. For instance, in the fourth embodiment, a method of successively changing the upper left coordinates of the blocks in the binary image is described. Although this method increases the calculation load, it improves performance of detecting the black blocks.

Figure 17:
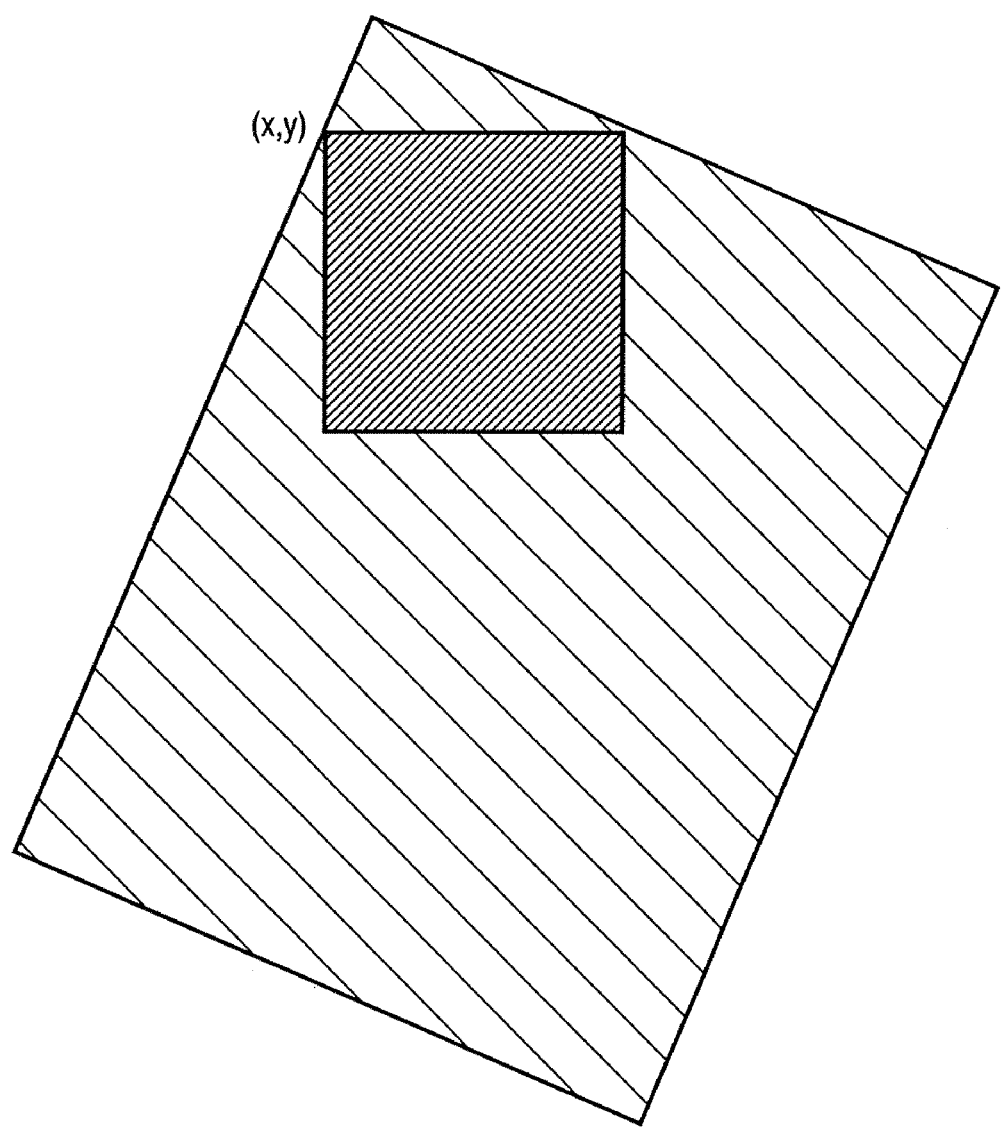
FIG. 17 is a diagram for explaining the black block searching method according to a fourth embodiment.

FIG. 17 is a diagram showing an instance of searching for the black block in the rectangular object according to the fourth embodiment. According to the drawing, it is understandable that the starting point (x, y) of the search according to the fourth embodiment is located out of the block boundary shown in FIG. 10 according to the third embodiment.

Figure 18:
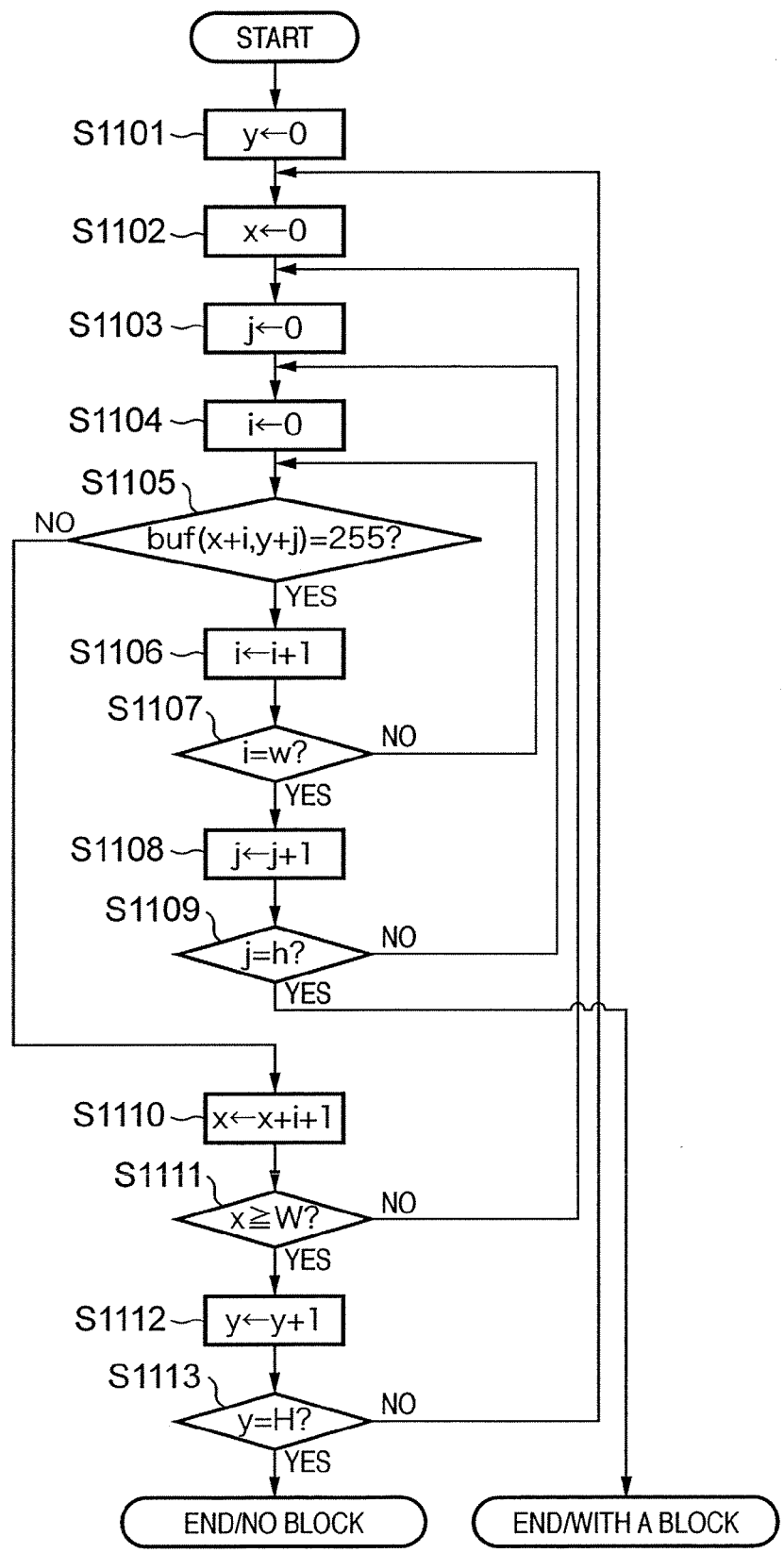
FIG. 18 is a flowchart showing the black block searching process according to the fourth embodiment.

FIG. 18 shows a flowchart of the black block searching process according to the fourth embodiment, which is described in detail.

First, variables y, x, j and i are initialized with the value 0 in steps S1101 to S1104 respectively. It is determined whether or not buf(x+i, y+j) is 255 indicating the black pixel in a step S1105. If it is 255, the process proceeds to a step S1106. If not, the process proceeds to a step S1110.

The variable i is incremented by just 1 in a step S1106. If i is equal tow indicating the block width in a step S1107, the process proceeds to a step S1108. If different, the process proceeds to the step S1105.

The variable j is incremented just by the value 1 in the step S1108. If j is equal to h indicating the block height in a step S1109, the process terminates, and at this time, the block of w×h pixels of which the upper left starting point is (x, y) is detected as the black block. If j is different from h, the process returns to the step S1104.

In a step SillO, i+1 is added to x. If x is incremented merely by the value 1 here, exactly the same results can ultimately be obtained. However, i+1 is added so as to exclude a wasteful search and speed up the processing.

If x is equal to or larger than W indicating the image width in a step S1111, the process proceeds to a step S1112. If not, the process returns to the step S1103.

In a step S1112, y is incremented by just the value 1. In a step S1113, if y is equal to H, indicating the image height, the process terminates. At this time, it is determined that no black block exists. If y is not equal to H, the process returns to the step S1102.

The black block of w pixels×h pixels is detected from the binary image of W pixels×H pixels by the above processing. Thereafter, the black pixel connection area filling and rectangle detection processes can be performed as in the third embodiment.

As described above, according to the fourth embodiment, it is possible to detect the black block of predetermined size more precisely. Therefore, labeling can be performed only to an effective object with higher precision, and consequently more precise rectangle detection becomes possible.

According to the above-described third and fourth embodiments, all the pixels in the block should be black pixels as the condition for declaring the block a black block. However, there are cases in which a large number of white pixels get mixed inside the black pixel area depending on the condition of the noise. Thus, it is also possible, according to the present invention, to count the number of black pixels inside the block so that, if the block exceeds the predetermined threshold, the block is determined to be a black block.

The black block to be searched for does not necessarily have to be a rectangle. As can be appreciated by those of ordinary skill in the art, the black block may instead be a polygon such as a hexagon, a circle or an ellipse, or it may be selectable according to the shape of the assumed object.

It is also possible, by not limiting the size of the search block to one predetermined size, to start the search from a large block size, such that, for example, if the object is not discovered, the search is repeated by gradually reducing the size. Thus, it is possible to avoid the danger of mistakenly taking an object smaller than the assumed one for the noise and ignoring it.

Fifth Embodiment

Background Elimination

Figure 19A:
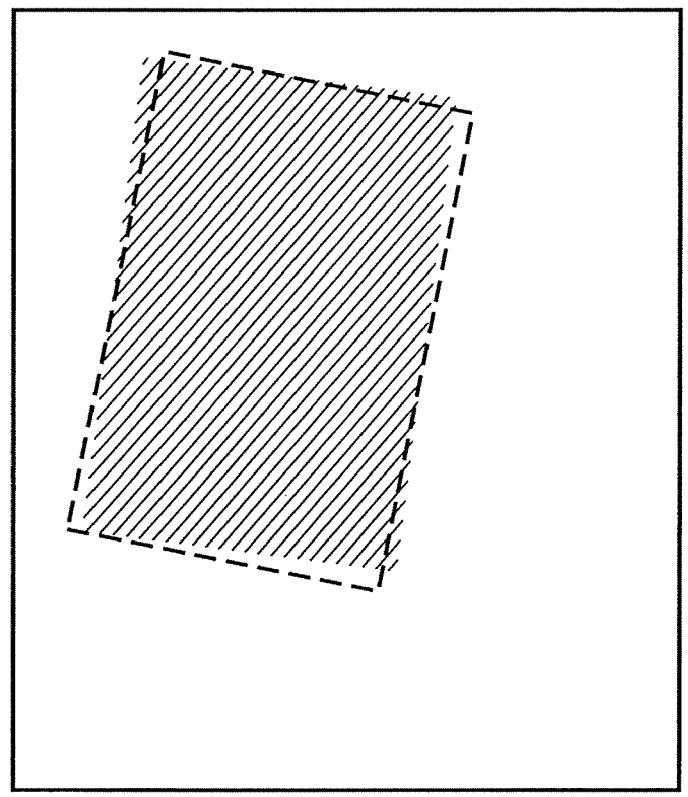
FIGS. 19A and 19B are diagrams showing an example of a carved-out image with insufficient rectangle detection precision.
Figure 19B:
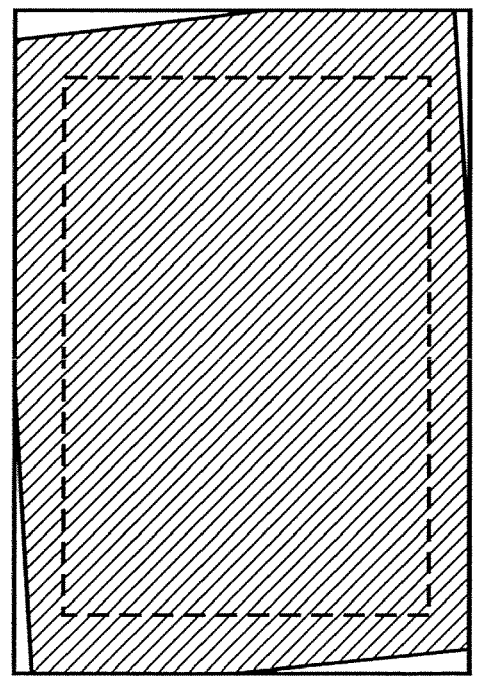

An overview of a typical rectangle carving-out process is described by referring to FIGS. 19A and 19B. First, as for FIG. 19A, consideration is given to the case of carving out the rectangular portion indicated by dots from the image surrounded by solid lines. In this case, if the precision of carving out is low, a slightly deviated rectangle is carved out as shown by the dashed lines in this drawing. FIG. 19B shows an appearance of such deviated carving-out results having the bias filling correction performed thereto. It is understandable from this drawing that background areas are inside-the four sides of the carving-out results like wedges.

FIGS. 19A and 19B schematically shows a typical example of the rectangle carving-out, where the four sides do not necessarily become symmetric, and it is also likely that the background is inside only one side.

Therefore, with the conventional carving-out process, in general, as shown by the dashed lines in FIG. 19B, the background was not included in the carving-out results by carving out the rectangle further inside than the detection results indicated.

However, with this conventional carving-out process, as shown in FIG. 19B, there was a possibility of losing a part of the information on the foreground to be primarily carved out by narrowing the carving-out area so as not to include the background in the carving-out results.

Thus, an object of a fifth embodiment is to provide the image processing method and image processing apparatus capable of minimizing cutoff of the background mixed area in the rectangular image carved out of the original image in order to solve the above-mentioned problem.

Another object is to provide an image processing method and image processing apparatus capable of efficiently detecting the rectangular image even in a noise-rich environment.

Figure 20:
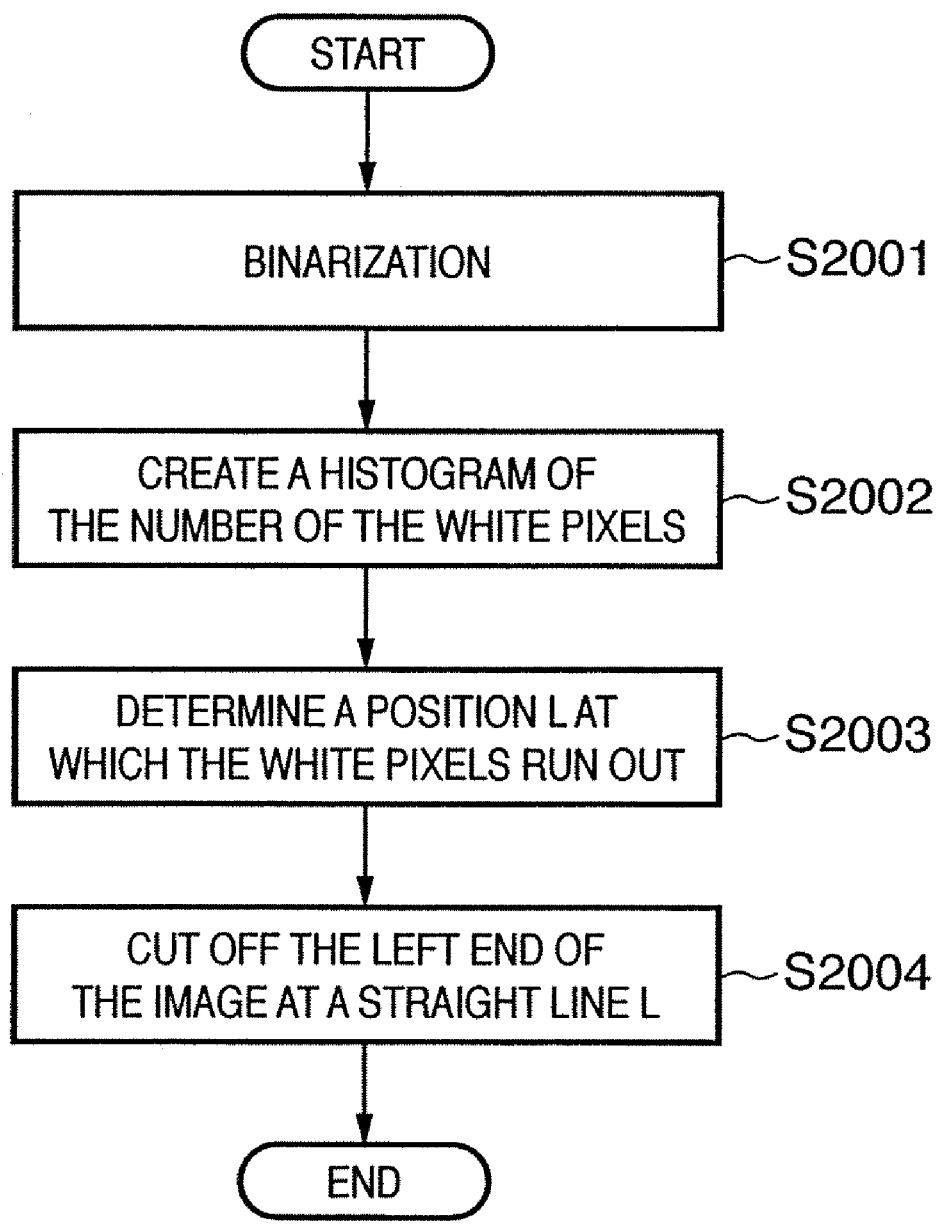
FIG. 20 is a flowchart showing a background elimination process according to the embodiment.

Hereafter, a background elimination process according to this fifth embodiment is described using the flowchart shown in FIG. 20, taking the left end of the image as an example.

First, in a step 2001, the carved-out image is binarized by using a known simple binarization method. In this case, the binarization threshold can be set arbitrarily by a user via a predetermined UI and so on.

Figure 21:
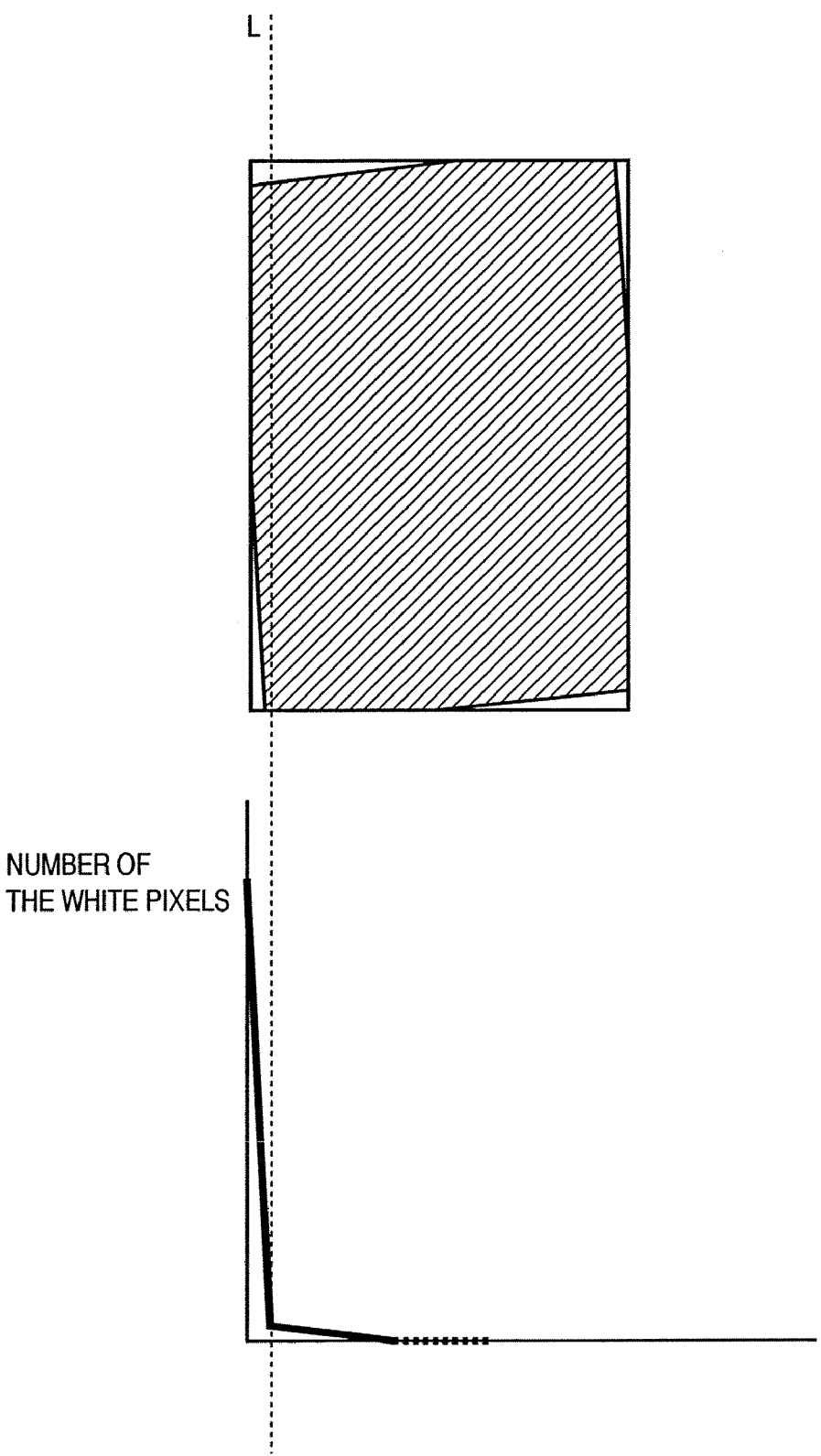
FIG. 21 is a diagram showing an example of the horizontal histogram of the number of white pixels at the left end of an image.

In a step 2002, a histogram of the number of the white pixels is created by the same method as that of creating the histogram of the number of the black pixels described with reference to FIG. 4. It should be noted that, although a histogram of the entire image was created by the method in FIG. 4, it is sufficient here to create one of only the proximate area of the left end of the image. A subject area for creating this histogram may be set up appropriately according to the system. For example, if the size of the carved-out rectangular image is w pixels×h pixels, it is sufficient to create a histogram of the area of w/20 pixels or so from the left end. FIG. 21 shows an example of the created histogram. In FIG. 21, the upper part is the carved-out binary image, and the lower part is the histogram of the white pixels.

In a step 2003, the area in which the white pixels are mixed is determined in the carved-out image, and the right end of the white pixel mixed area is indicated as a straight line L. As is clear from the histogram shown in FIG. 21, the histogram gets close to 0 around the portion in which the white pixels mixed at the left end of the carved-out image run out. The histogram does not completely become 0 due to the white pixels mixed at the top of the image and the influence of the noise. This embodiment is characterized by utilizing such a characteristic of the white pixel histogram to cut off the white pixel area mixed in the carved-out image. To be more precise, in FIG. 21, the area from the left end of the histogram to the position at which the height of the histogram becomes small enough compared to the height of the image h (about 3 percent of h, for instance) is determined as the white pixel mixed area, and the right end of the white pixel mixed area is indicated as the straight line L. As a determination threshold of the straight line L (3 percent in this example) depends on the performance of the scanner and so on, it is also possible to have the threshold set up arbitrarily by the user.

Next, in a step 2004, the white pixel mixed area is cut off from the carved-out image. To be more specific, in FIG. 21, the left end of the carved-out image is cut off by the straight line L so as to eliminate the background at the left end of the image.

As described above, it is possible to eliminate the white pixel mixed area, that is, background pixels as to the four sides of the carved-out image by repeating the background elimination process for the left end of the image described by using FIG. 20 likewise to the right end, top and bottom thereof.

As described above, according to this embodiment, it is possible to precisely cut off the white pixel mixed area at the end of the image caused by insufficient carving-out precision of the scanned rectangular area, thus allowing the rectangular area to be efficiently detected without narrowing the carving-out area, even in a noise-rich environment.

Sixth Embodiment

Hereafter, a sixth embodiment of the present invention is described. The system configuration of the sixth embodiment is the same as that of the above-mentioned fifth embodiment, and so a description thereof is omitted.

The above-mentioned fifth embodiment considers an example wherein the position of the rectangle is automatically determined, it is carved out, the bias filling is corrected and thereafter the white pixel mixed area at the end of the image is cut off. However, the present invention is not limited to such an instance, and it is also possible to cut off the white pixel mixed area after performing a general manual rectangular scan.

Here, a description is given by referring to the flowchart in FIG. 22 as to the operation in the case of having a general image scan application executed on the system shown in FIG. 1. First, in a step S2201, the entire surface of the document glass of the scanner 110 is scanned at a low resolution of 75 dpi or so, and the obtained bitmap data is stored in the RAM 105. The low-resolution bitmap is then displayed on the display unit 103 in a step S2202, and the user specifies a desired rectangle (a photo area, for instance) on the displayed bitmap by using the keyboard 102, mouse 102a and so on in a step S2203. The specified rectangular area is scanned at a high resolution in a step S2204, and next, manual trimming is further performed to the obtained high-resolution rectangle data by using the mouse 102a and so on in a step S2205.

As described above, according to the scan procedure having been performed so far, the rectangle selection is performed based on a low-resolution preview, and then the high-resolution scan and trimming are performed. As for this method, precision of the position is not sufficient because the rectangle selection is performed based on the low-resolution preview, and so trimming work in a step S2205 is essential. Otherwise, mixture of the white pixels is accepted, or an area sufficiently inside the original rectangle is specified when specifying the rectangle in the step S2203.

Thus, according to the sixth embodiment, the manual trimming process shown in the step S2205 is replaced by the background elimination process described by using FIGS. 20 and 21 in the above-mentioned fifth embodiment. The trimming process can thereby be automated.

As described above, according to the sixth embodiment, it is possible to improve the quality of the rectangle data such as the scanned photo image while using the general scan application.

As described above, according to the fifth and sixth embodiments, it is possible to keep the cutoff of background mixed area minimum in the rectangular image carved out of the original image.

Therefore, it is possible to detect the rectangular image efficiently even in the environment of plenty of noise.

The present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted on or connected to the computer, after the program code read out from the storage medium is written in a memory of the extension card or unit.

When the present invention is applied to the storage medium, that storage medium stores program codes corresponding to at least one of the flow charts shown in FIGS. 4, 5, 11, 13, 15, 16, 18, 20 and 22 mentioned above.

As many apparently widely different embodiments of the present invention can be made without departing from the spirit and scope thereof, it is to be understood that the invention is not limited to the specific embodiments thereof except as defined in the appended claims.

The invention claimed is:

1. An image processing method for detecting a rectangular area from an image, comprising:
using an image processing apparatus to perform image processing steps as follows:
a binarizing step of binarizing an original image to obtain a binary image;
a histogram creation step of creating histograms of numbers of black pixels of the binary image, in each of a horizontal direction and a vertical direction;
a rectangle extent detection step of performing a trapezoidal approximation to the histograms so as to detect an extent of a rectangular area in said binary image; and
an inclination direction detection step of detecting an inclination direction of said rectangular area in said extent,
wherein said rectangle extent detection step includes the steps of:
using a hypothesis that said rectangular area is a rectangle;
applying a linear approximation by regression analysis to right and left hypotenuses of the trapezoidal approximation so that a shape of the histogram becomes a trapezoid whose right and left hypotenuses are symmetric;
comparing precisions of the linear approximation applied to the right and left hypotenuses; and correcting data of one hypotenuse based on data of the other hypotenuse wherein the precision of the linear approximation of said one hypotenuse is better than that of said other hypotenuse.

2. The image processing method according to claim 1, wherein said rectangle extent detection step performs the trapezoidal approximation to each of said horizontal and vertical histograms of said binary image, and detects the extent of the rectangular area in each of the horizontal and vertical directions of said binary image.

3. The image processing method according to claim 1, wherein the trapezoidal approximation is performed based on the data of said one hypotenuse whose precision of the linear approximation is better than that of said other hypotenuse.

4. The image processing method according to claim 1, wherein the rectangular area is an area for showing a photo image.

5. The image processing method according to claim 4, wherein, in a case in which said original image is an image having a plurality of photo images placed apart in a horizontal scanning direction, said histogram creation step divides said binary image for each of said photo images in the horizontal scanning direction and creates said histogram for each of the divided binary image.

6. The image processing method according to claim 4, wherein, in a case in which said original image is an image having a plurality of photo images placed apart in a vertical scanning direction, said histogram creation step divides said binary image for each of said photo images in the vertical scanning direction and creates said histogram for each of the divided binary image.

7. The image processing method according to claim 1, wherein the binarizing step including the step of binarizing a multivalue original image so as to obtain said binary image.

8. The image processing method according to claim 1, further comprising a labeling step of labeling said binary image, and wherein said histogram creation step creates the histogram having the number of said labeled pixels.

9. An image processing apparatus for detecting a rectangular area from an image, comprising:
   a binarizing unit which binarizes an original image to obtain a binary image;
   a histogram creation unit which creates histograms of numbers of black pixels of the binary image, in each of a horizontal direction and a vertical direction;
   a rectangle extent detection unit which performs a trapezoidal approximation to the histograms so as to detect an extent of a rectangular area in said binary image; and
   an inclination direction detection unit which detects an inclination direction of said rectangular area in said extent,
   wherein said rectangle extent detection unit includes:
   a unit which uses a hypothesis that said rectangular area is a rectangle;
   a unit which applies a linear approximation by regression analysis to right and left hypotenuses of the trapezoidal approximation so that a shape of the histogram becomes a trapezoid whose right and left hypotenuses are symmetric;
   a unit which compares precisions of the linear approximation applied to the right and left hypotenuses; and
   a unit corrects data of one hypotenuse based on data of the other hypotenuse wherein the precision of the linear approximation of said one hypotenuse is better than that of said other hypotenuse.

10. A computer program stored in a computer readable medium, the computer program enabling a computer to perform an image processing method for detecting a rectangular area from an image, comprising:
    a binarizing step of binarizing an original image to obtain a binary image;
    a histogram creation step of creating histograms of numbers of black pixels of the binary image, each of in horizontal direction and vertical direction;
    a rectangle extent detection step of performing a trapezoidal approximation to the histograms so as to detect an extent of a rectangular area in said binary image; and
    an inclination direction detection step of detecting an inclination direction of said rectangular area in said extent,
    wherein said rectangle extent detection step includes the steps of:
    using a hypothesis that said rectangular area is a rectangle;
    applying a linear approximation by regression analysis to right and left hypotenuses of the trapezoidal approximation so that a shape of the histogram becomes a trapezoid whose right and left hypotenuses are symmetric;
    comparing precisions of the linear approximation applied to the right and left hypotenuses; and
    correcting data of one hypotenuse based on data of the other hypotenuse wherein the precision of the linear approximation of said one hypotenuse is better than that of said other hypotenuse.

* * * * *